United States Patent [19]

Schober et al.

[11] Patent Number: 5,404,160

[45] Date of Patent: Apr. 4, 1995

[54] SYSTEM AND METHOD FOR IDENTIFYING A TELEVISION PROGRAM

[75] Inventors: Gary W. Schober, Edison; Raymond B. Chadwick, Kearny; Francis R. Ashley, South Plainfield, all of N.J.

[73] Assignee: Berkeley Varitronics Systems, Inc., Metuchen, N.J.

[21] Appl. No.: 81,842

[22] Filed: Jun. 24, 1993

[51] Int. Cl.⁶ .................. H04N 7/08; H04N 17/00; H04N 17/04

[52] U.S. Cl. ............................. 348/1; 348/461; 348/473; 455/2

[58] Field of Search ............... 358/84, 142, 139, 10, 358/185, 86; 455/2; H04N 7/08, 17/00, 17/04; 379/92; 348/1, 23, 4, 5, 13, 17, 162, 432, 433, 460, 461, 465, 463, 467, 473, 474, 475, 486, 722

[56] References Cited

U.S. PATENT DOCUMENTS

| | | | |
|---|---|---|---|
| 2,903,508 | 9/1959 | Hathaway | 358/84 |
| 3,130,265 | 4/1964 | Leonard | 358/84 |
| 3,312,900 | 4/1967 | Jaffe | 358/84 |
| 3,372,233 | 3/1968 | Currey | 358/84 |
| 3,806,805 | 4/1974 | Wall | 235/52 |
| 4,031,543 | 6/1977 | Holz | 358/86 |
| 4,425,578 | 1/1984 | Haselwood et al. | 358/84 |
| 4,577,220 | 3/1986 | Laxton et al. | 358/84 |
| 4,697,209 | 9/1987 | Kiewit et al. | 358/84 |
| 4,807,031 | 2/1989 | Broughton et al. | 358/142 |
| 4,847,685 | 7/1989 | Gall et al. | 358/84 |
| 4,967,273 | 10/1990 | Greenberg | 358/142 |
| 5,019,899 | 5/1991 | Boles et al. | 358/84 |
| 5,200,822 | 4/1993 | Bronfin et al. | 358/142 |
| 5,235,414 | 8/1993 | Cohen | 358/84 |

FOREIGN PATENT DOCUMENTS

0195639  9/1986  European Pat. Off. ............ 358/84

OTHER PUBLICATIONS

King, Patrick, "A Novel TV Add-On Data Communication System"; Hazeltine Research, Inc., Chicago, Ill., 60639.

Primary Examiner—James J. Groody
Assistant Examiner—Safet Metjahic
Attorney, Agent, or Firm—Robert A. Green

[57] ABSTRACT

The disclosure is of a system and method of detecting or identifying a received TV program by forming a database of identifying digital bits for a plurality of programs, processing a TV program by modulating the luminance of pairs of lines of the program and reconstituting the program with said modulated line pairs and the other components of a TV program signal. The reconstituted program is transmitted to a location at which it is decoded to recover the digital identifying bits and comparing such bits with bits in the database to identify the transmitted program.

28 Claims, 33 Drawing Sheets

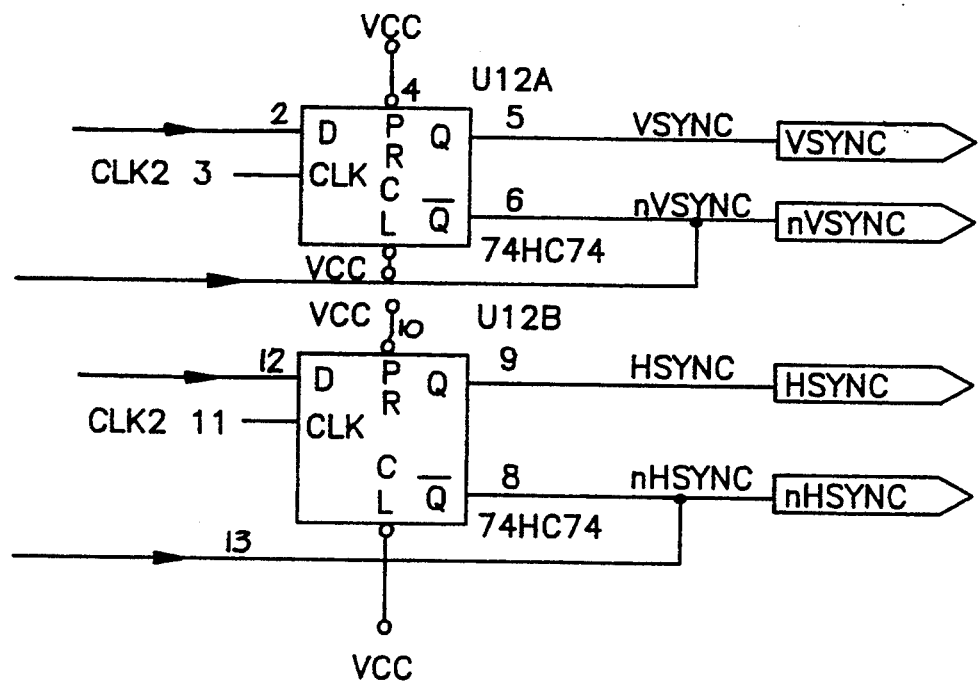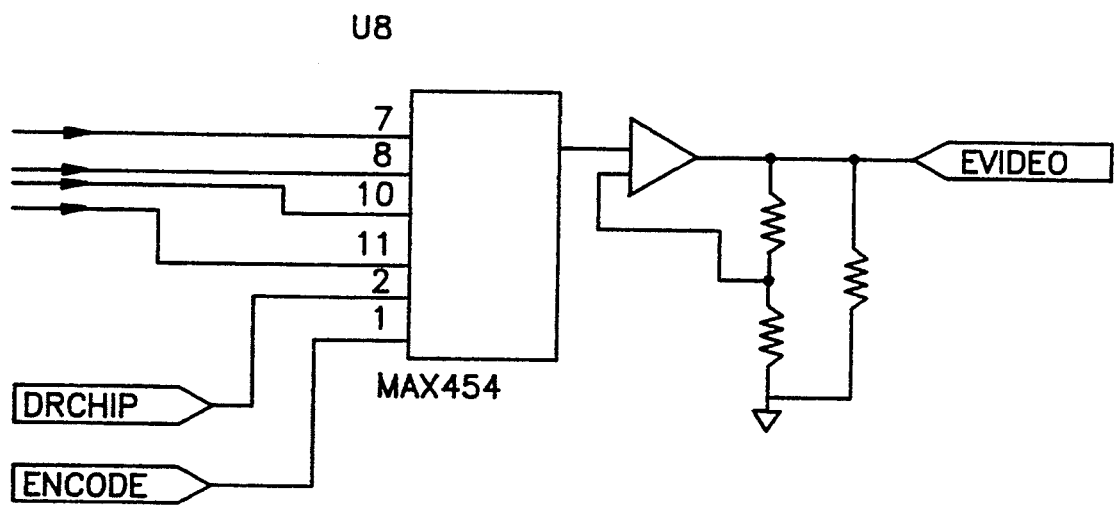
FIG. 5B

SYSTEM AND METHOD FOR IDENTIFYING A TELEVISION PROGRAM

BACKGROUND OF THE INVENTION

The television broadcast industry has always depended upon sampling TV viewers to indicate to a particular advertiser the network's individual share of the potential audience, Various systems have been developed to automatically measure viewership but with mixed results. Historically, systems which depend upon the network affiliates' cooperation have usually been compromised because these systems interfered with signal handling equipment or the system itself became a tool which the network could use to detect program substitutions made by the affiliate.

Classic approaches to the task of audience measurement have been either to modify the TV set, add external circuits such as tuners, or measure the TV set's local oscillator frequency, all of these techniques being indirect methods of finding out what a viewer is watching. These indirect methods have practical problems since more and more television is distributed by cable TV systems which often indiscriminately reassign different channels to the network stations.

It is known to conduct surveys of television audiences to determine the popularity of television programs. Various sytems have been developed for automatically determining which station is being viewed to reduce interaction between the person conducting the survey and the television-viewer.

U.S. Pat. No. 2,903,508 to Hathaway teaches a survey system wherein the horizontal and vertical synchronization signals are subjected to a cyclical phase shift to "tag" the broadcast signal. A magnetic induction pickup receives the synchronization signals emitted by the television receiver and processes these signals to detect the cyclical phase shift. A second receiver is tuned to a known station and the cyclical phase shift is monitored. When the cyclical phase shifts match, it is concluded that the television set being monitored is tuned to the same station as that of the known television receiver.

U.S. Pat. No. 3,130,265 to Leonard teaches a system for determining the channel to which a television receiver is tuned by also relying upon detection of the phase of synchronization (sync) pulses. In this system, transmitters are controlled so that the sync pulses of each transmitter are out of phase by a known amount with respect to the sync pulses of all other transmitters. This sytem requires that the conductor of the survey have control over the broadcast transmitters.

Systems such as those shown in U.S. Pat. Nos. 3,312,900 to Jaffe and 4,577,220 to Laxton et al detect the frequency to which a local oscillator of a receiver is tuned to determine the channel being viewed.

In a system shown in U.S. Pat. No. 3,806,805 to Wall, a television receiver imposes a load variation pattern on the main power supply line which is representative of the channel to which the receiver is tuned. An audience measuring system is responsive to variations in the main power supply line to identify the station.

U.S. Pat. No. 3,372,233 to Currey teaches a monitoring system wherein the sync signal of a monitored receiver is combined with the sync signal of a receiver tuned to a known station. The phase relationship of these two sync signals indicates whether the monitored receiver is tuned to the known station.

U.S. Pat. No. 4,847,685 to Gall teaches a system for automatically surveying television viewership by detecting both the horizontal and vertical sync pulses and determining their relative phase from a reference counter driven from another TV tuner. The difference in phase corrected by distance the signal travels is an indication of which channel is being viewed.

U.S. Pat. No. 5,019,899 to Boles et al is an electronic data encoding and recognition system which processes each frame of a TV program to form a digital signature of each frame. These digital signatures are compared with a database of signatures to determine the identity of a program in TV transmission.

U.S. Pat. No. 4,807,031 to Broughton et al teaches a system wherein control data are encoded on only a portion of a selected sequence of video test image fields. This sytem is unsatisfactory because it requires an optical sensor to be attached on the viewer's TV screen which blocks the image, is sensitive to variations in brightness, requires selected video content, introduces visual distortion, is far too slow to identify programs at a rate sufficient for the industry's needs and does not permit unobtrusive sensing of the television set in the householder's home.

An article entitled "A Novel TV Add-On Communication System", IEEE Transactions On Broadcast And Television Receivers, Vol. BTR-19, No. 4, pp. 225–230 by Patrick T. King describes a television modulation system in which added information is sent through a television channel along with the standard video signal. This paper describes modulating lines of a TV picture but it is clear that the paper does not utilize line modulation in the method described herein.

None of the known TV program identifying systems is satisfactory for present day industry needs.

SUMMARY OF THE INVENTION

The system and method of the invention provide fast and accurate identification of a broadcast TV program. The system of the invention forms an identifying digital "signature" for a plurality of frames of a known video transmission by modifying the luminance portion of a plurality of adjacent pairs of lines in the transmission. The lines are electronically processed in pairs to convert each field to a digital bit and a plurality of fields of a transmission are thus processed to form a plurality of digital bits which identify a particular program and are stored in a database.

At some time, when an unknown program is transmitted, it is electrostatically picked up from a picture tube and it is processed as above, in pairs, to provide its multi-bit digital signature. This digital signature is compared with the signatures in the database and when a match is made, the identity of the transmitted program is known.

The present invention also includes a novel means for extracting a complete TV program signal from a TV set which is receiving the TV program. The extracted program signal is true to the original transmitted program and includes all of the signal components thereof. This signal extraction means includes a wire closely coupled to the rear end of the picture tube of the TV set on a support carrying associated circuit elements.

It has been known, as taught in U.S. Pat. No. 4,031,543, to electrostatically extract horizontal synch pulses from the picture tube of a TV set. However, nowhere is there teaching for extracting a complete TV program signal and never in the manner described and claimed herein.

DESCRIPTION OF THE INVENTION

The present invention relates generally to a method and apparatus for processing a known television transmission to form a digital identifying code or "signature" therefrom which is stored in a database. An unknown program transmission can then be processed similarly and then decoded to form its identifying signature which is compared with signatures in the database to find a match and to thereby identify the unknown program.

A brief and general description of the invention is as follows. The system operator generates an identifier for each TV program in a library of programs which might be aired and these identifiers are stored in a database in other portions of the system to be described. In one arrangement, the identifier includes the name of the program and a number of digital bits representing the program.

Figure 1:
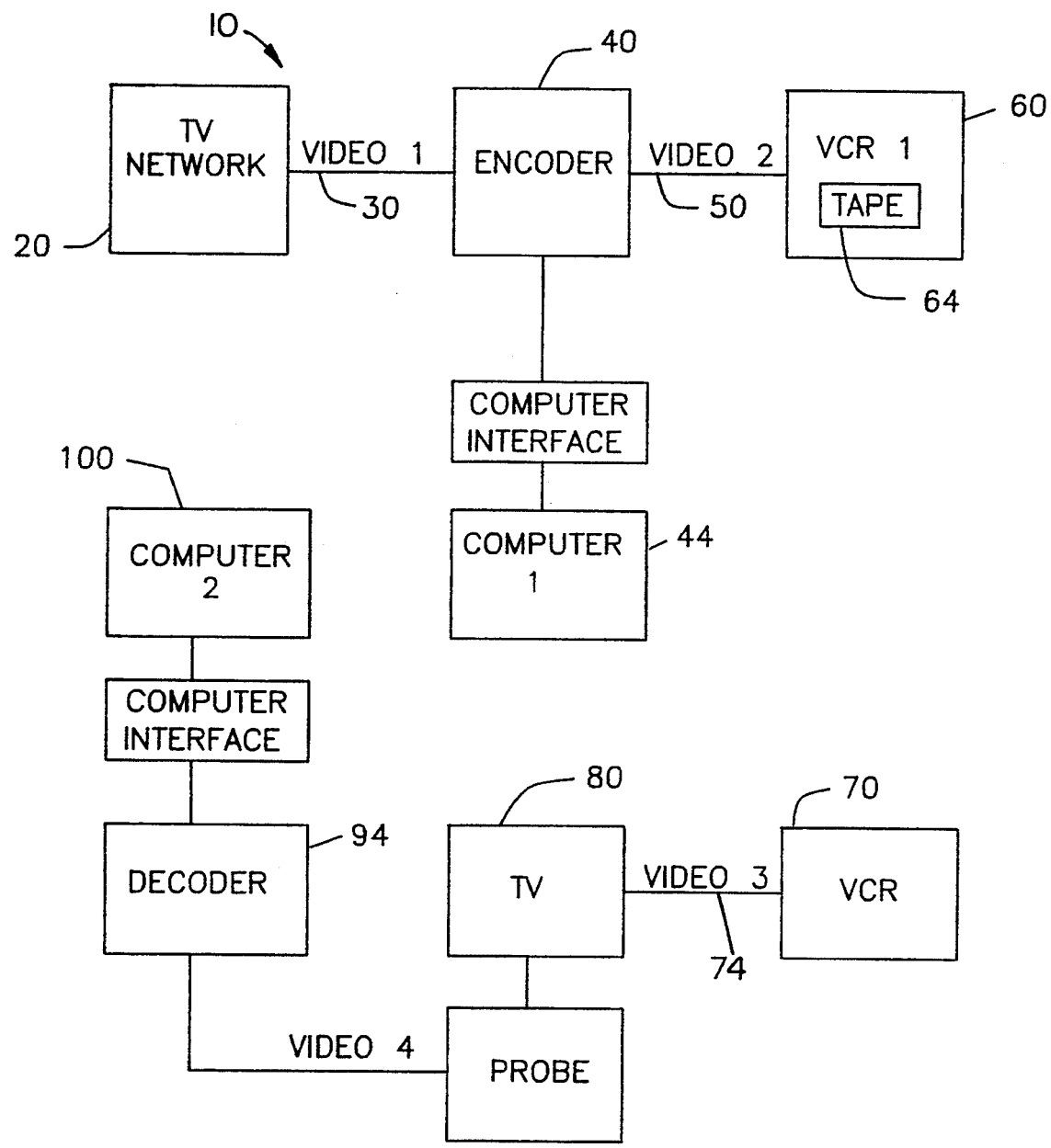
FIG. 1 is a block diagram of the system of the invention.

Reference is made to FIG. 1 which shows a general block diagram of the system of the invention 10. In FIG. 1, block 20 represents a TV network transmitter which is a source of TV programs and is operated to transmit a typical TV program identified as video 1 on lead 30. The program is transmitted in normal fashion to an encoder system 40 which is to be described with reference to FIG. 2. The encoder processes the video signal under the control of a first computer 44 and transmits its output, the encoded video, as video 2 on lead 50 to a first video recorder or VCR 60. The VCR 60 records the encoded video, video 2, on tape.

The encoding process produces the original TV program with non-detectable (to the viewer) brightened and darkened pairs of lines of a plurality of frames of the program. In US TV, normally a frame is made up of two fields, one the even numbered lines and one the odd numbered lines.

The tape is removed and then played on a second VCR 70. The output of the second VCR, Video 3, is fed on a lead 74 to a TV set 80. The TV set 80 plays the encoded video generated by the encoder 40 and this is viewed in normal fashion by a viewer. The brightening and darkening of adjacent lines of picture are not visible to the viewer's eye.

Figure 3:
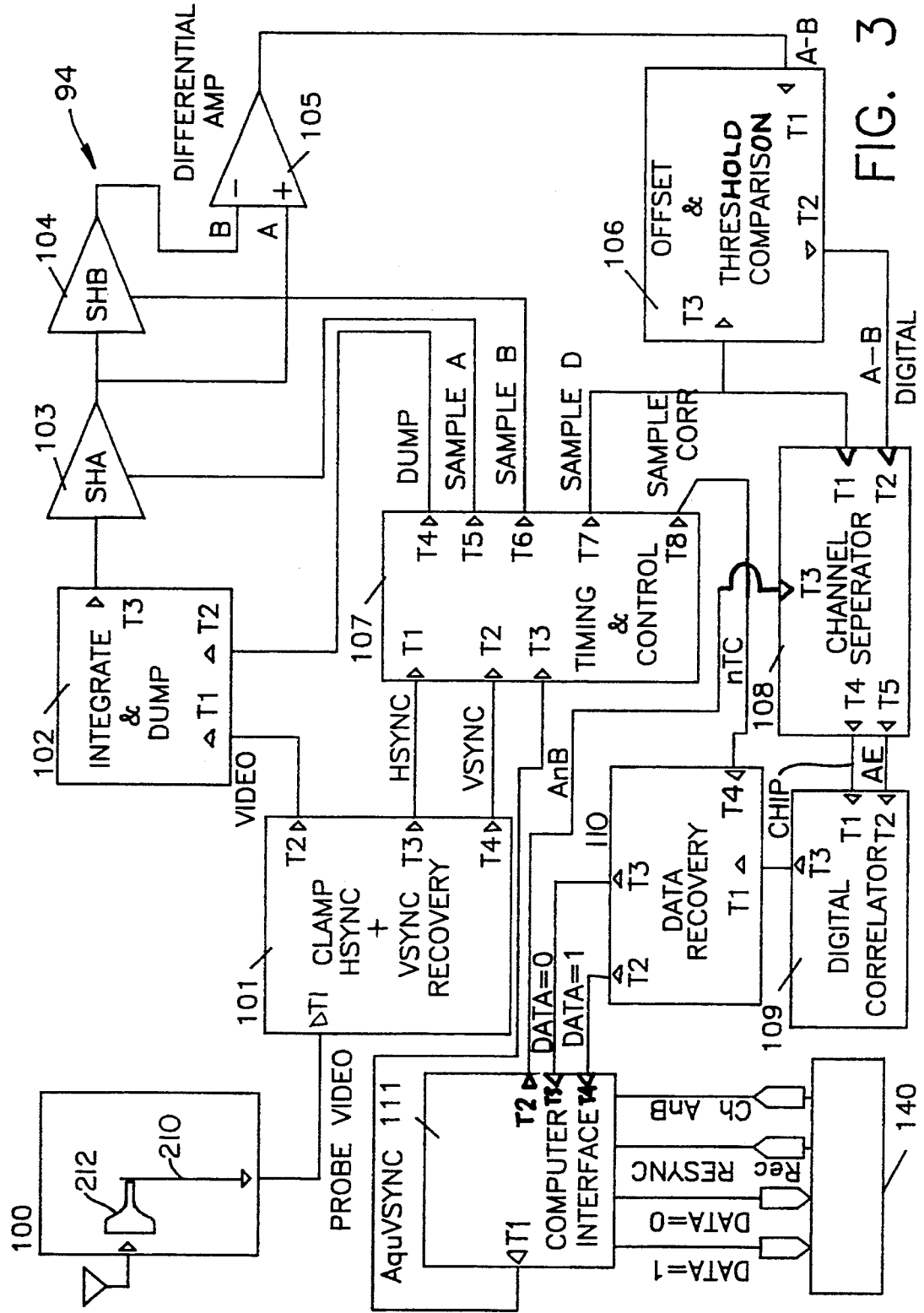
FIG. 3 is a block diagram of the decoder portion of the system of the invention.

The transmitted picture is taken off the TV set 80 by means of an electrostatic probe, a simple wire and a shielded amplifier, and this TV signal, as video 4, is coupled to a decoder system 94 to be described with respect to FIG. 3. The decoder of FIG. 3 processes the video signal to recover the information introduced in the encoder and this information is transmitted to a second computer 100 where the database of programs is stored and comparison is made with the database to determine whether the program played by player 70, the second VCR, is a known program whose identification is in the computer 100.

In one method for using the principles of the invention, the encoder processes and modulates 120 adjacent line pairs, however, other line arrangements could be used.

In operation of the invention, the system operator identifies each program in the data base with a title and a plurality of randomly selected digital bits. It has been found that forty bits serve successfully to identify a program. Such forty bits are randomly selected as, for example, 0,1,1,0,1,0 . . . 1,1,1,0,0. This program identification information is entered in computer 1 and computer 2 in the system of FIG. 1.

Figure 2:
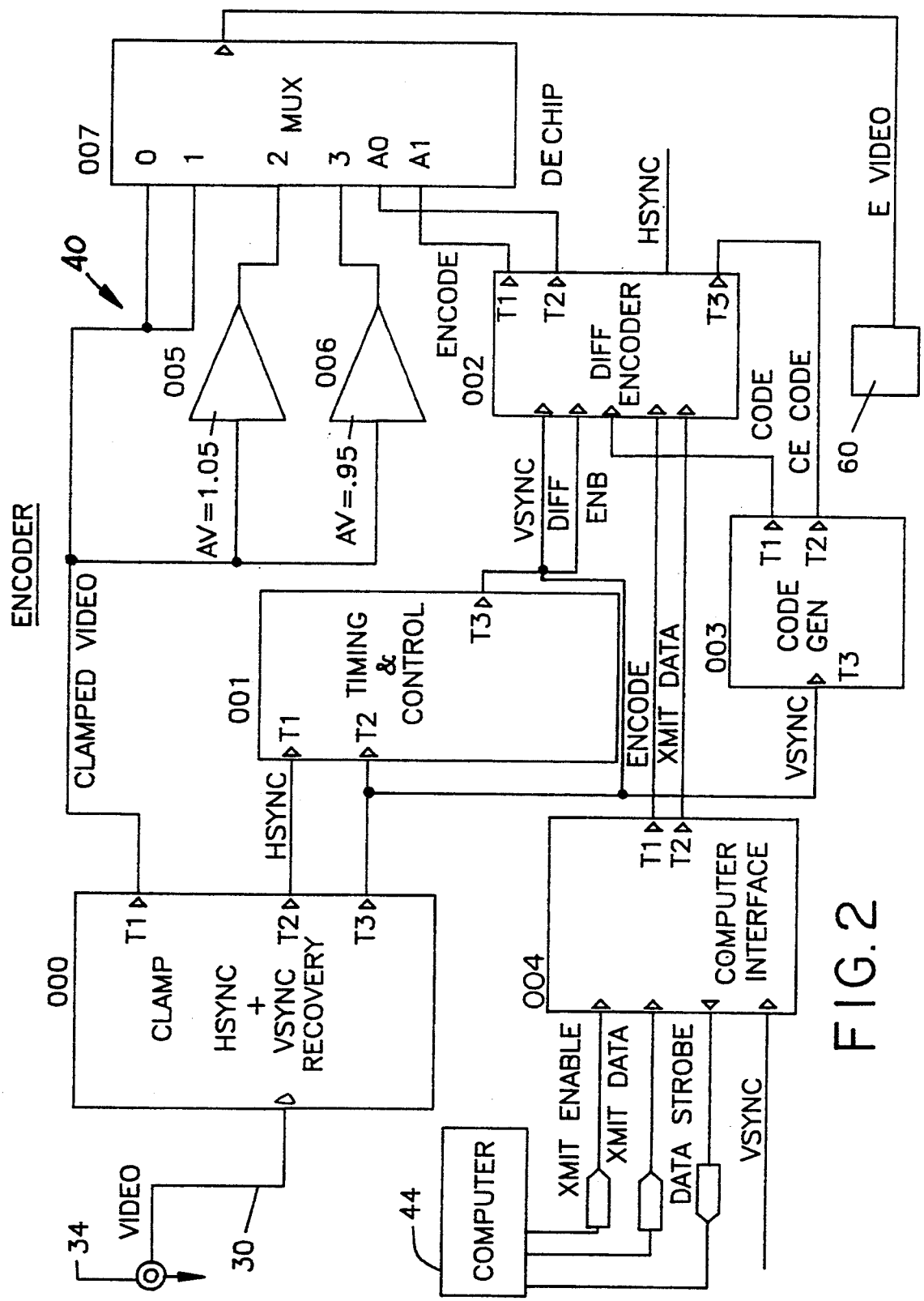
FIG. 2 is a block diagram of the encoder portion of the system of the invention.

Referring to FIG. 2 for a more detailed description of the encoder 40, the encoder includes a video input 34 which receives an incoming TV program signal. The video signal is applied to lead 30 which is coupled to a module 000 which performs a clamping function on the video signal, clamps the horizontal sync tips to ground, during the back porch and extracts the horizontal (Hsync) and vertical (Vsync) synchronization (sync) signals therefrom. The module 000 is shown in greater detail in the schematic representation in FIG. 5.

The module 000 includes a terminal T1 at which the clamped video appears and from which it is coupled to modulating modules 005 and 006 and to a multiplexer module 007. The modules 005 and 006 are amplifiers and are shown in more detail in FIG. 5. Multiplexer 007 is shown in greater detail in FIG. 5.

The video signal input to module 000 is a composite signal made up of color information, brightness information and horizontal and vertical sync information.

Module 000 filters the composite video signal and separates out the horizontal and vertical sync signals. The Hsync signal is used to determine when a line of video is starting and the Vsync signal is used to determine when a field of video is starting.

Module 000 includes a terminal T2 at which the Hsync signal appears and this terminal is coupled to terminal T1 of a timing and control module 001. Module 001 is shown in greater detail in FIG. 7 and includes counters which control which scan line is luminance modulated. It also determines which line of a field the system is on. Hsync is also coupled to module 002 which is a differential encoder. Module 002 is shown in greater detail in FIG. 7 and includes a 74HC175 module.

Module 000 also includes a terminal T3 at which the Vsync signal is present and from which it is coupled to a terminal T2 of the timing and control module 001 and to terminal T3 of module 003 which is a code generator and to the differential encoder 002.

Figure 6A:
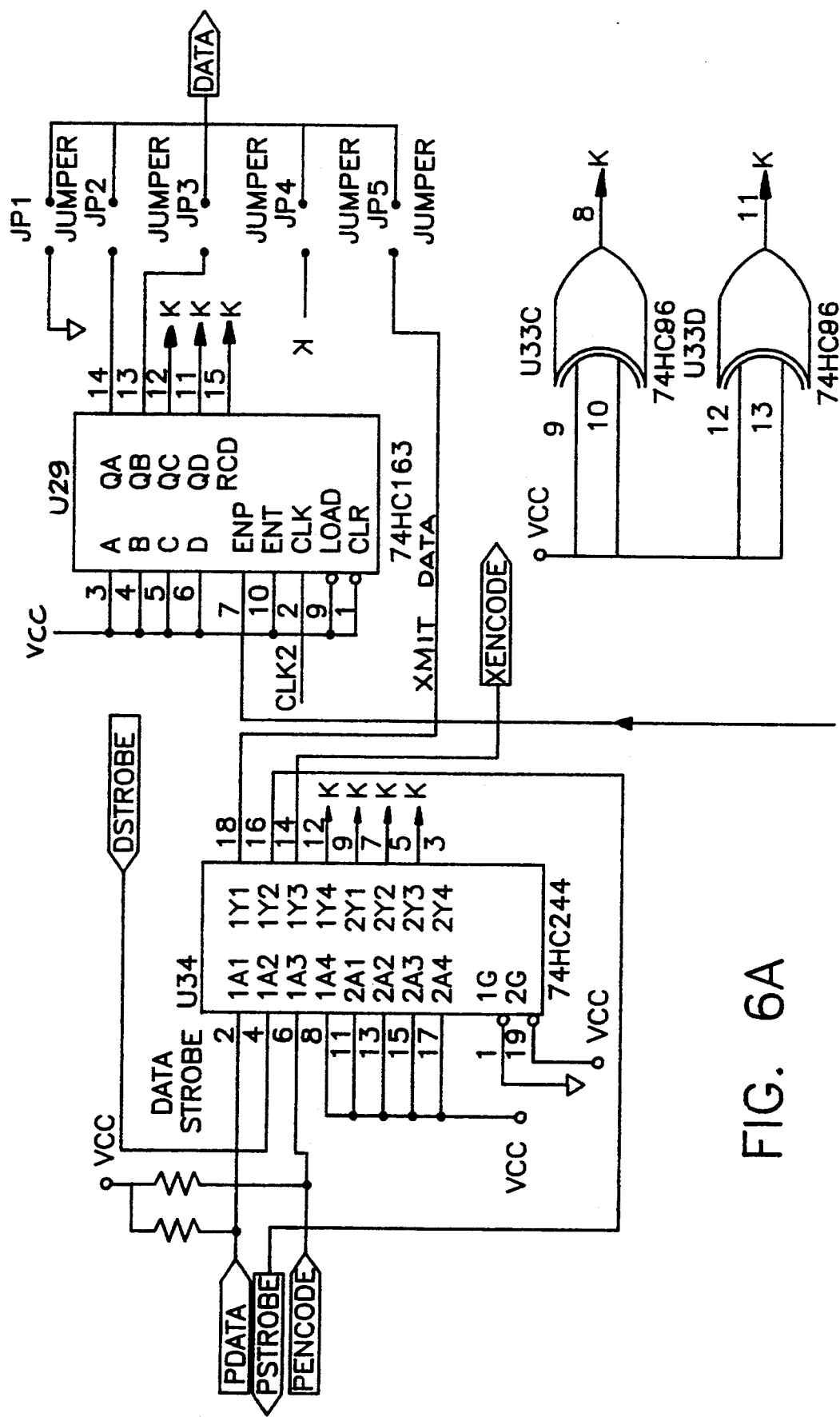
FIG. 6 is a detailed schematic representation of another portion of the encoder of FIG. 2.
Figure 6B:
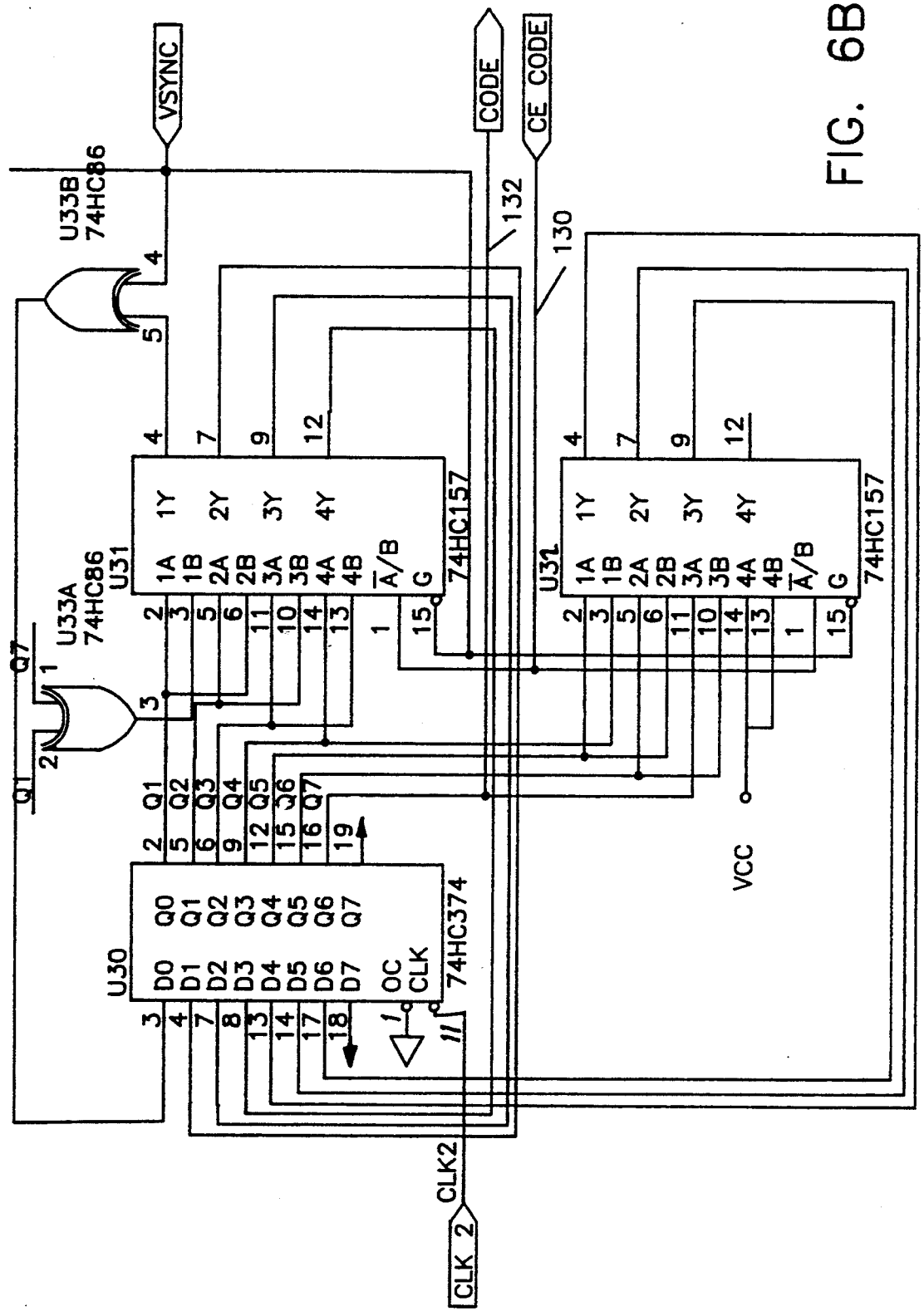
Figure 7A:
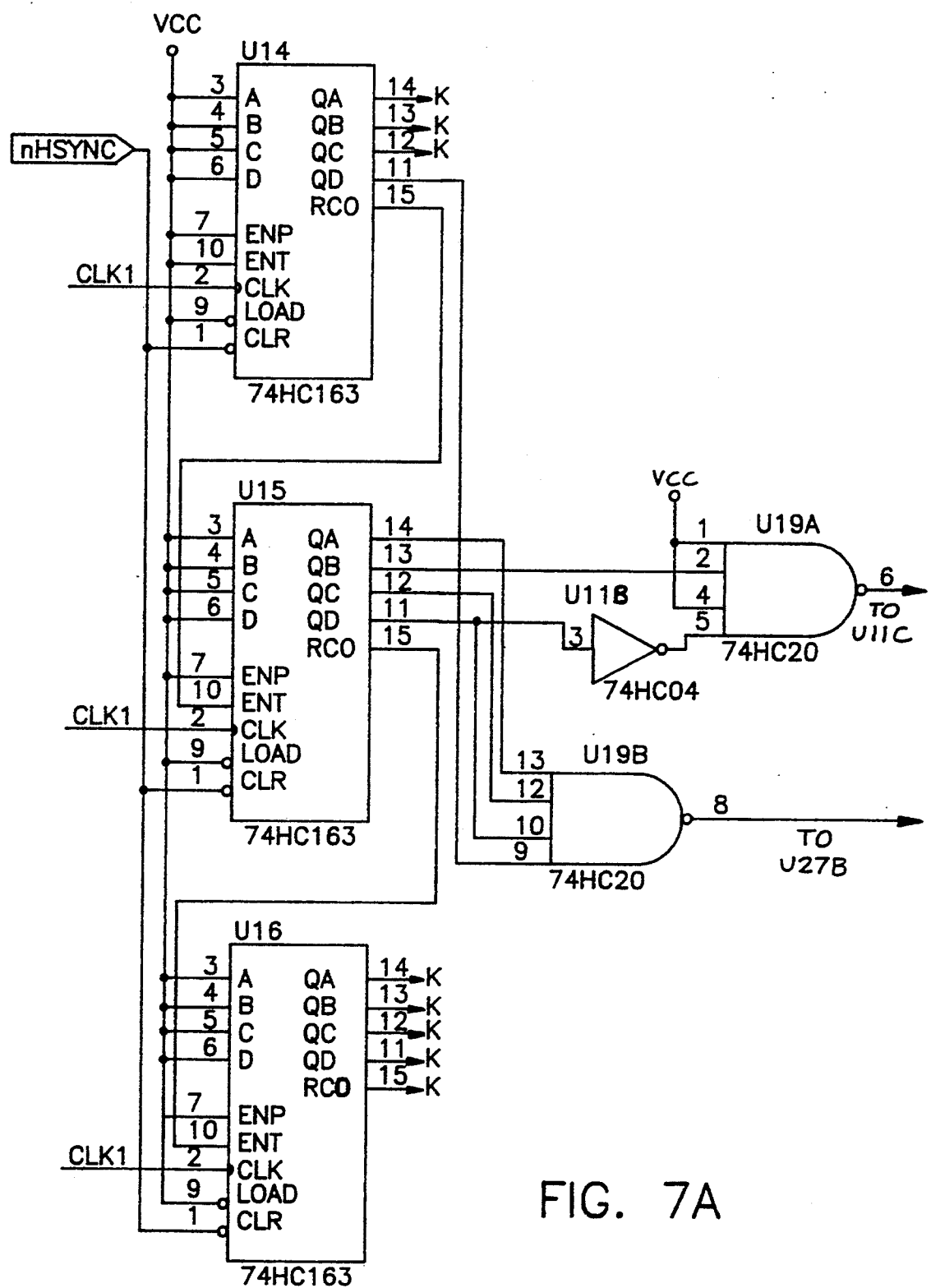
FIG. 7 is a detailed schematic representation of still another portion of the encoder of FIG. 1.
Figure 7B:
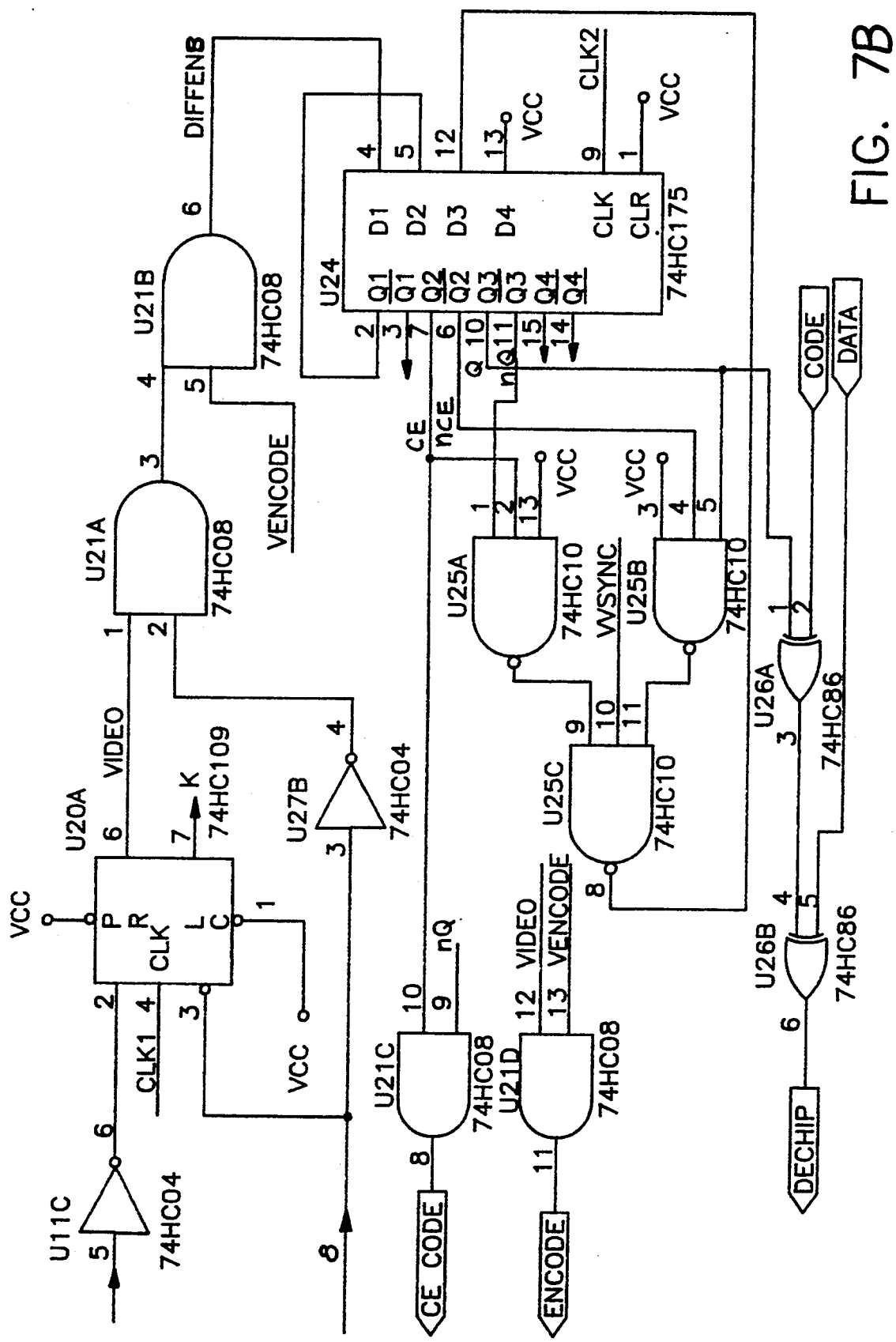
Figure 7C:
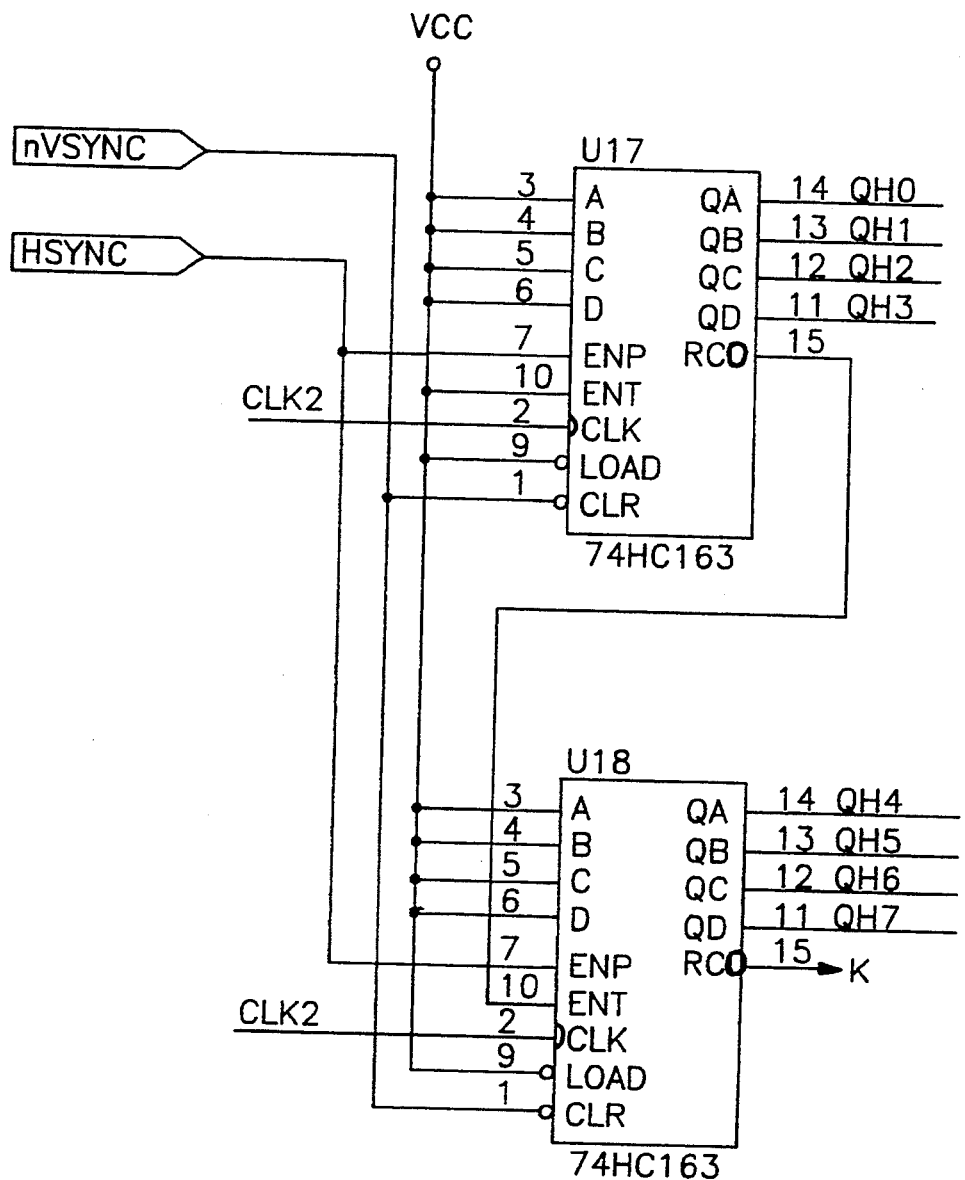
Figure 7D:
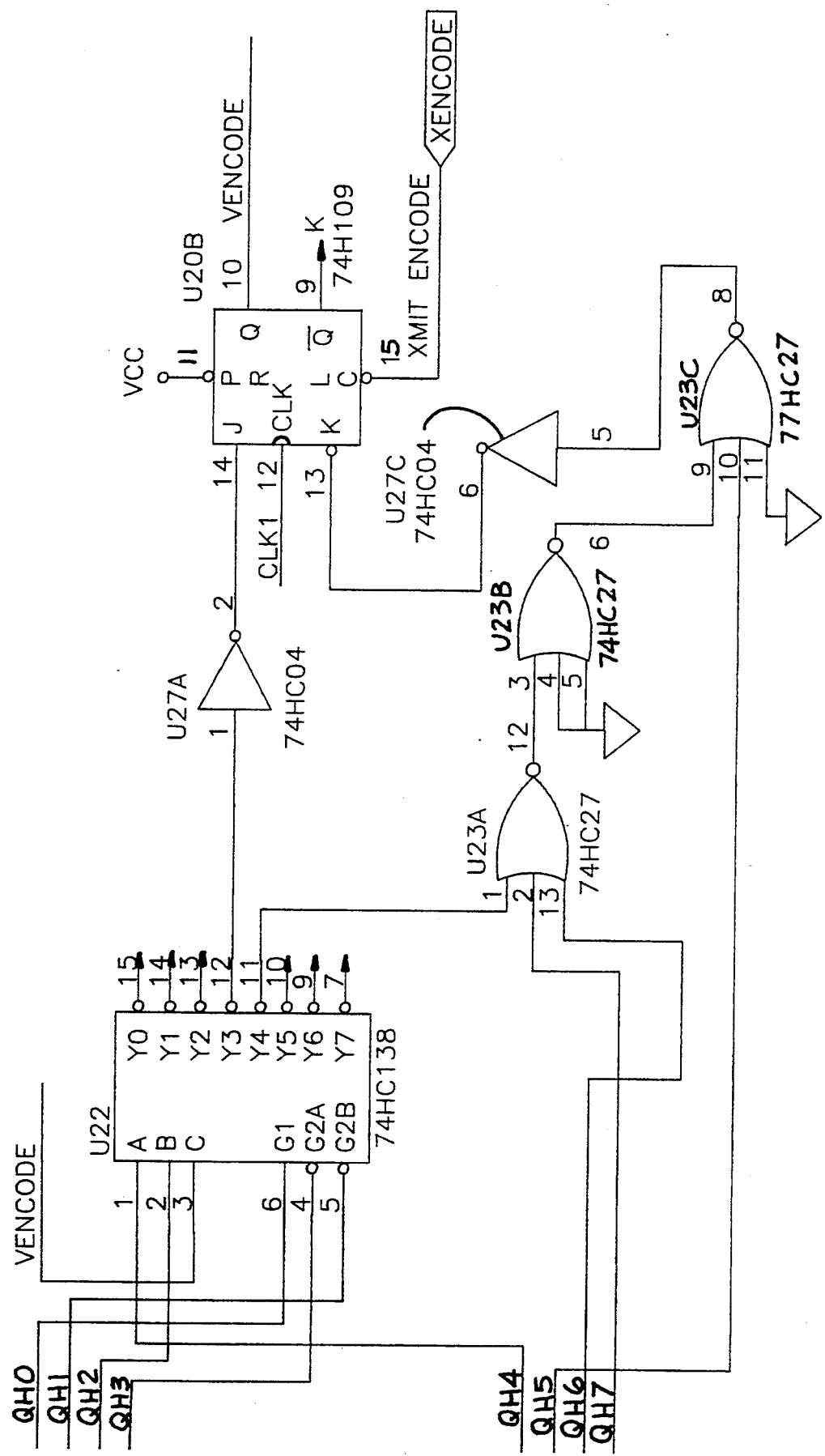

The code generator 003 is shown in greater detail in FIG. 6. The code generator 003 generates a predetermined series of 120 digital bits, called chips or PN codes, for each field of TV processed. In one mode of practicing the invention, the same group of 120 bits is used for each field processed and encoded.

Referring again to FIG. 2, the amplifier modules 005 and 006 have output terminals which are coupled to the terminals 2 and 3 of multiplexer 007. The multiplexer is shown in greater detail in FIG. 5. The multiplexer has an output terminal T1 which is coupled to a storage device which is the tape recorder VCR 60 in FIG. 1. The encoded video appears at the output terminal T1 of module 007.

The timing and control circuit 001 has an output terminal T3 which couples Diff ENB (enable differential encoder) signal to a differential encoder 002. The differential encoder 002 is shown in greater detail in FIG. 7. The module 002 has an output terminal T1 which is coupled to terminal A1 of the multiplexer 007 and a second output terminal T2 which is coupled to terminal A0 of the multiplexer 007. A0 is a signal from a truth table shown below.

The encoder system also includes a code generator module 003. The code generator is shown in greater detail in FIG. 6. The code generator has an input terminal T3 at which it receives the Vsync signal and an output terminal T1 which couples code bits individually to the encoder module 002 and another terminal T2 which receives CE(clock enable) signal from the differential encoder 002. The Vsync signal resets the code generator 003 to begin its operation at the beginning of a field of video information.

In operation of the encoder 40, the code terminal T1 carries the chip in the 120 chip code which is presently being processed. The CE code carries the clock enable code generator signal and this signal advances the code generator through the chips in the 120 chip code.

A computer which is the computer 44 in FIG. 1 contains the database of 40 digital bits for each program and is coupled to a computer interface 004 and couples a transmit enable signal to the interface. Vsync is also coupled to the interface. The output of the interface 004 couples an encode signal and a transmit data signal to the differential encoder 002 to control the operation thereof.

The encoder 40 of FIG. 2 operates as follows. A TV program is received at the input terminal 34 to module 000 which filters the composite video signal and clamps the video signal which is coupled to the inputs of amplifiers 005 and 006 and to the "0" and "1" terminals of module 002. The Hsync and Vsync signals are filtered out and Vsync is coupled to timing and control module 001, the differential encoder 002 and the code generator 003 which are initialized thereby and to the computer interface 004. The Vsync is used in module 001 to determine the start of a video field and to initiate processing of the lines of the video field.

According to the invention, the luminance portion of adjacent lines of a TV picture are encoded in pairs with one member of the pair being brightened and with the other member of the pair being darkened. It is noted that the system of the invention operates most satisfactorily at the present time by modulating the luminance of adjacent pairs of lines, since the luminance in adjacent pairs of lines is likely to be closely similar. Other systems, perhaps more complex, could be devised to use other pairs of lines.

The system of the invention operates as follows. When the first picture line of a TV transmission is received, the computer 44 sends the first of the 40 data bits for that program, a "0" as shown above, to the differential encoder 002 on the XMIT DATA line and at the same time, the code generator 003 sends the first bit or chip of the 120 chip code on the Code line to the differential encoder 002 and the two signals are exclusive ORed in the differential encoder to produce a D@Chip signal. This signal determines whether the first encodable line of video is to be brightened or darkened in the multiplexer 007. This is controlled by the truth table shown below.

Assuming that the first line is brightened, this first analog signal, the brightened luminance, is the E video signal and is sent from the multiplexer 007 to a recording means such a tape recorder e.g. VCR 60 in FIG. 1.

When the next line of video appears, the same data bit, the "0" that is stored in module 002 along with the next bit from the code generator, are exclusive ORed to produce the D@Chip, however, in this case the differential encoder inverts the D@Chip signal to darken the line of video. The brightening and darkening are controlled by the multiplexer acting on the amplifiers 005 and 006.

The following truth table controls the brightening and darkening of the lines of the TV picture with the first applying to the first line of a pair and the second applying to the second line of a pair.

| Data Bit | Chip Bit | D@Chip | Action |
|---|---|---|---|
| FIRST LINE | | | |
| 0 | 0 | 0 | Brighten |
| 0 | 1 | 1 | Darken |
| 1 | 0 | 1 | Darken |
| 1 | 1 | 0 | Brighten |
| SECOND LINE | | | |
| 0 | 0 | 1 | Darken |
| 0 | 1 | 0 | Brighten |
| 1 | 0 | 0 | Brighten |
| 1 | 1 | 1 | Darken |

The D@Chip signal coupled to terminal 2 and 3 of the differential encoder 002 operates to cause the amplifiers 005 or 006 to brighten or darken the luminance of each line as controlled by the truth table. The multiplexer 007 outputs a signal, E video, which is stored on tape.

It is noted that the brightening or darkening of a line is at such a level that it is not detectable by a viewer.

The foregoing encoding operation is performed for the 120 pairs of lines in a picture field with one of the data bits and one of the bits from the code generator 003 being processed together for each pair of lines.

Each modulated line of the picture is stored on tape with the video able to be reconstituted from the tape as the original but carrying the brightened and darkened picture lines which are embedded invisibly in the program video.

To summarize briefly, the encoding operation is performed on 120 pairs of lines per field and each pair of encoded lines is called a chip. In the system of the invention 120 chips contained within a field define a single information bit (when decoded) and forty consecutive TV fields of video comprise 40 such information bits or a complete program code for a particular program. The above-described encoding procedure is carried out for all of the fields of a TV program.

Figure 4:
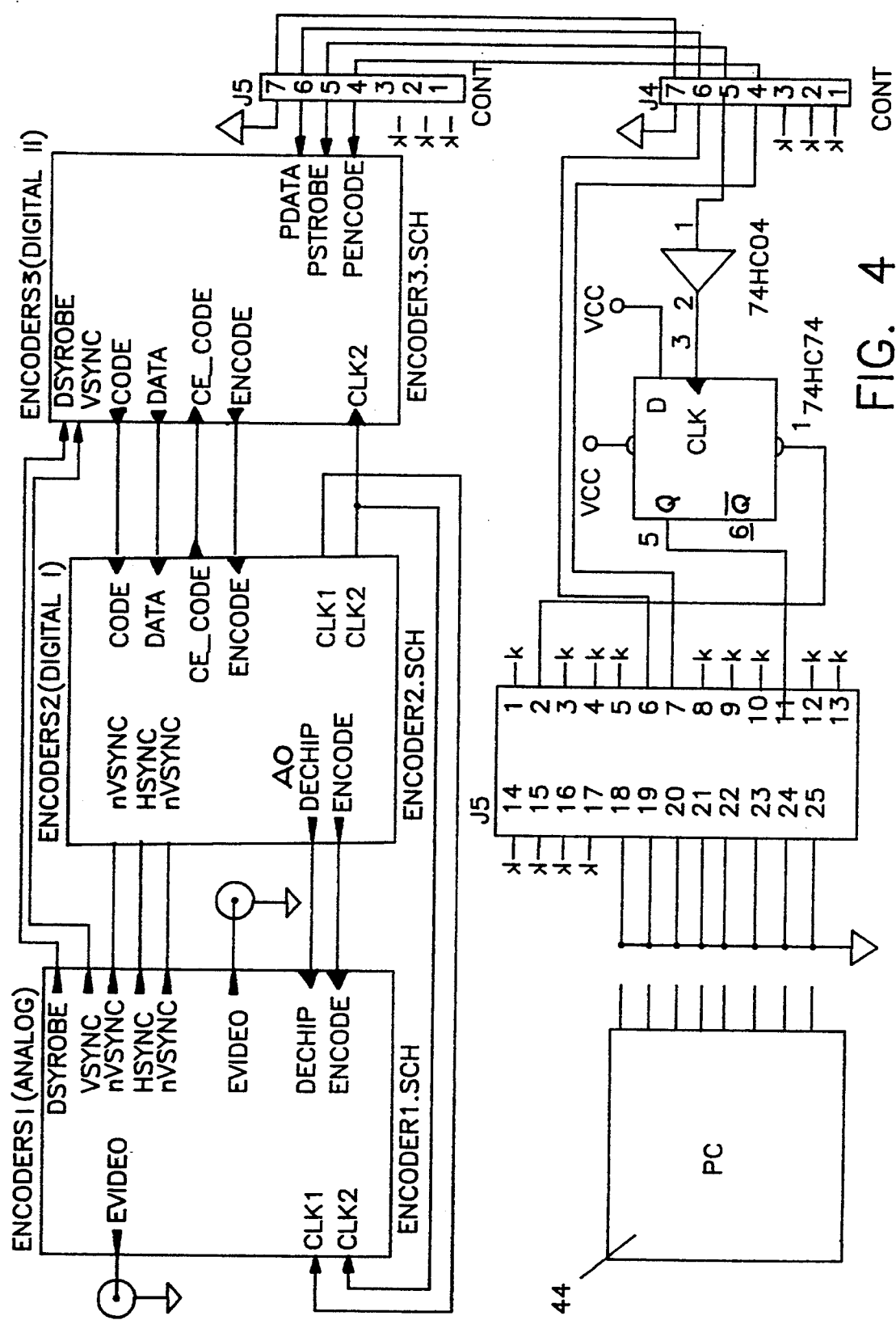
FIG. 4 is a detailed schematic representation of a portion of the encoder of FIG. 2.

FIGS. 4, 5, 6 and 7 show portions of the encoder system in greater detail. FIG. 4 shows the multiplexer 007 and differential encoder 002 represented by three blocks and the coupling thereof to the computer and computer interface. FIG. 4 also shows components U2 and U3 which provide handshaking between the computer 44 and the video encoder. Module U2 is an inverter and module U3 is an edge triggered flip-flop. The encoder sets the flip-flp high for a data request and the computer resets the flip-flop when the data has been sent to the encoder. FIG. 4 also shows the computer 44 coupled to the computer interface, module 004, and to the modules 002, 003 and 007.

Figure 5A:
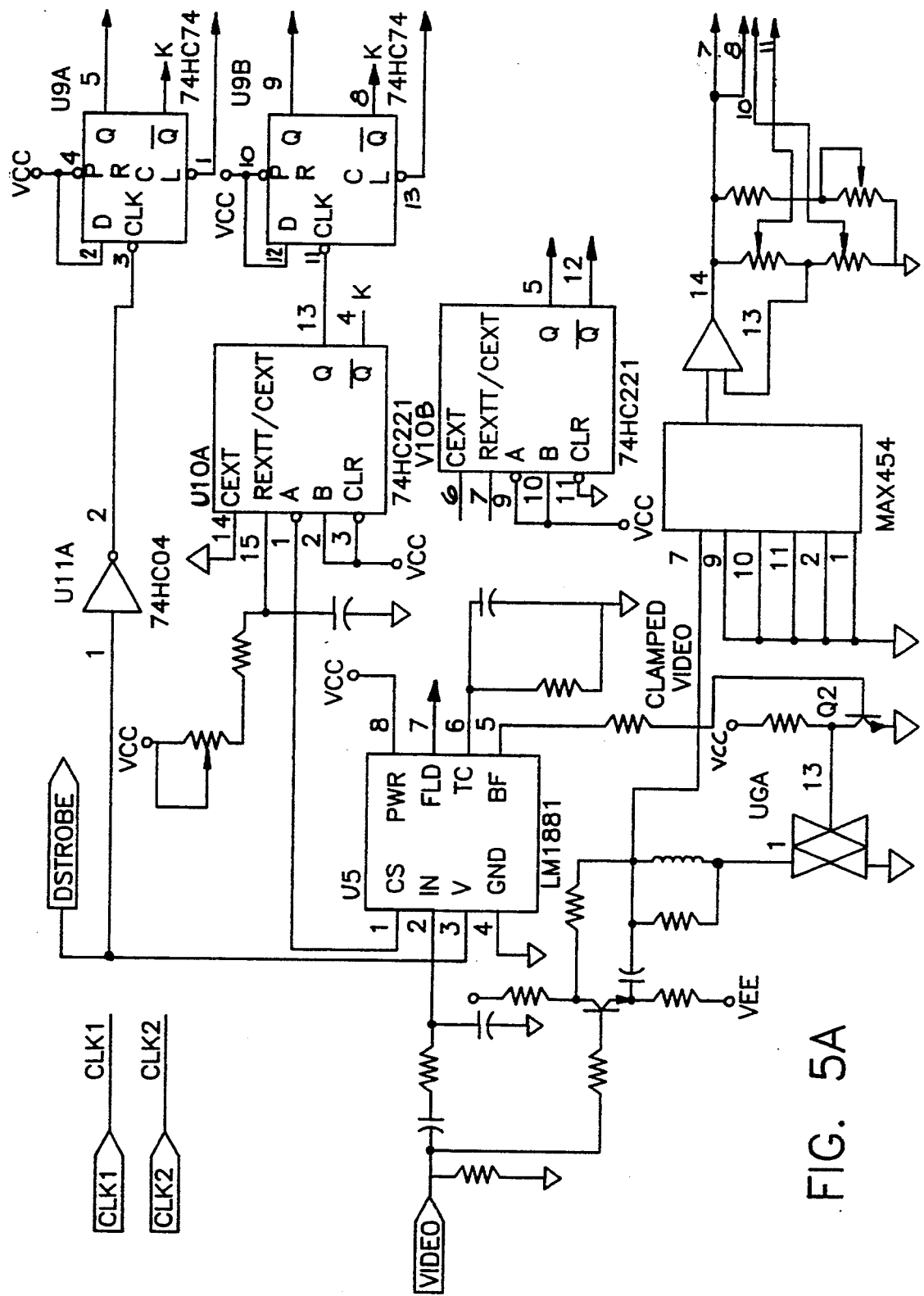
FIG. 5 is a detailed schematic representation of another portion of the encoder of FIG. 2.

FIG. 5 is a schematic representation showing the input video on lead 30, clamped by CMOS switch U6A and fed to circuit or module U5 which is in module 000 (FIG. 2). Module U5 is an LM 1881 sync separator circuit. The detected Vsync signal determines the start of a field. The composite sync signal is fed to circuit U10A which is a 74HC221 one shot multivibrator and to U9B and U12B which are edge triggered flip-flops which select out the Hsync signal. The Vsync signal is extracted by inverter U11A and edge-triggered flip-flops U9A and U12A operated as rising edge detectors.

The clamped video is fed to to module U7 and its associated circuitry including amplifiers 005 and 006 and adjustable resistors R16 and R17 which control the brightening and darkening functions.

Multiplexer 007 is module U8 out of which comes the encoded video, E video. Module 001 includes circuits U17 and U18 (FIG. 7) which form a counter whose output is the current line of video being processed. Circuits U22, U23, U20B and U27A decode the counter's output.

FIG. 6 shows the code generator, which is module 003. The code generator includes two 74HC86 gates, U33A and U33B and modules U30, U31 and U32 which are multiplexers. Module U33 is an edge-triggered register. The code generator receives the clock enable signal on lead 130 and transmits the code bits on lead 132 to the differential encoder, module 002.

The computer interface U34 is also shown and comprises a portion of a 74HC244 circuit used as a bus buffer and driver circuit.

In FIG. 7, module 001, the timing and control circuit, includes circuits U14, U15, U16 which form a counter which is initialized at the start of a line and it divides the horizontal sync signal into a plurality of portions or bins, 255 being used in one embodiment of the innvention because this number provides good timing accuracy without requring excessive hardware. This permits the system to know exactly where the Hsync signal ends and luminance to be modulated begins. The associated circuitry, determines the line position of the system as it operates. The start of a line is determined by circuit U5 (FIG. 5) which generates a horizontal sync pulse. Its output is decoded by circuits U11B, U19A, U20A, U19B, U27B, U21A and U21B (FIG. 7). Circuits U17 and U18 keep count of the line that the system is on. Circuits U24, U25B, U25C, U26A and U26B are the differential encoder 002.

The D@Chip is generated by gate U26B and appears on lead 134 (FIG. 7).

Referring to FIG. 3, the decoder of the invention 94 includes a TV receiver 100 to which is coupled an electrostatic probe, a wire 210, which is placed at the rear end of the picture tube 212 externally of the TV cabinet. The probe 210 is coupled to a module 101 and it couples the TV program signal thereto to an input terminal T1. The module 101 is similar in function to module 000 in the encoder system 40 shown in FIG. 2. The module 101 has a video clamp output terminal T2, a horizonal sync (Hsync) terminal T3 and a vertical sync (Vsync) signal terminal T4.

The video clamp output terminal T2 of module 101 is coupled to an input terminal T1 of a module 102 which integrates the luminance in a TV line and dumps a charged capacitor at the end of the line to permit the system to begin to process the next line. The module 102 is shown in greater detail in FIG. 8. The output terminal T3 of module 101 couples the Hsync signal to input terminal T1 of a timing and control module 107 shown in FIG. 9 and being similar in function to module 001 in the encoder of FIG. 2. The output terminal T4 of module 101 is coupled to input terminal T2 of module 107.

The module 102 has a second input terminal T2 which is coupled to output terminal T4 of module 107 to receive the dump signal therefrom. Module 102 also as an output terminal T3 which is coupled to the input of a sample and hold amplifier 103 and output terminal T5 of module 107 couples a sample A signal to the amplifier 103. The output of module 103 is coupled to the input of a second sample and hold amplifier 104 which is connected to output terminal T6 of module 107 and receives a sample B signal therefrom. The circuitry of modules 103 and 104 is shown in greater detail in FIG. 8.

Figure 8:
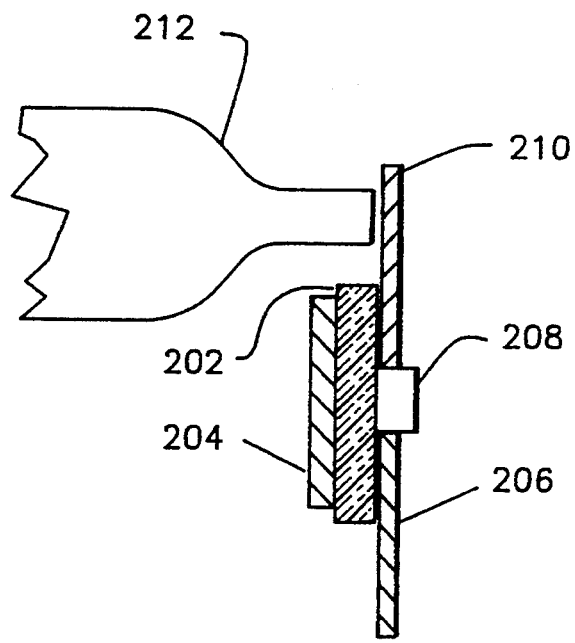
FIG. 8 is a detailed schematic representation of a portion of the decoder of the invention.

The output of amplifier 104 is coupled to one input, denoted B input, of a differential amplifier 105 and the output of amplifier 103 is coupled to a second input, denoted A input of differential amplifier 105 (FIG. 8).

Figure 11A:
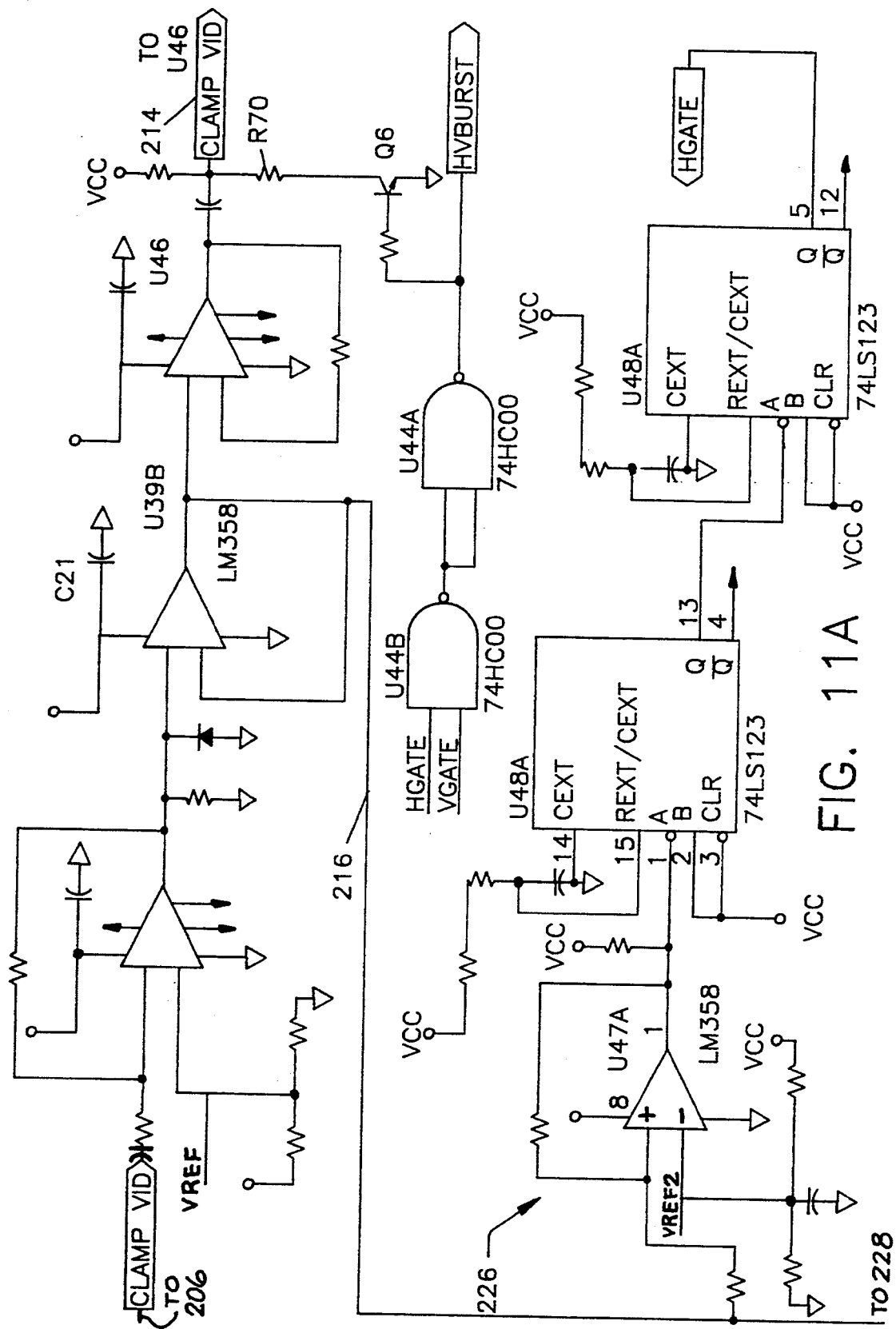
FIG. 11 is a detailed schematic representation of another portion of the decoder of the invention.
Figure 11B:
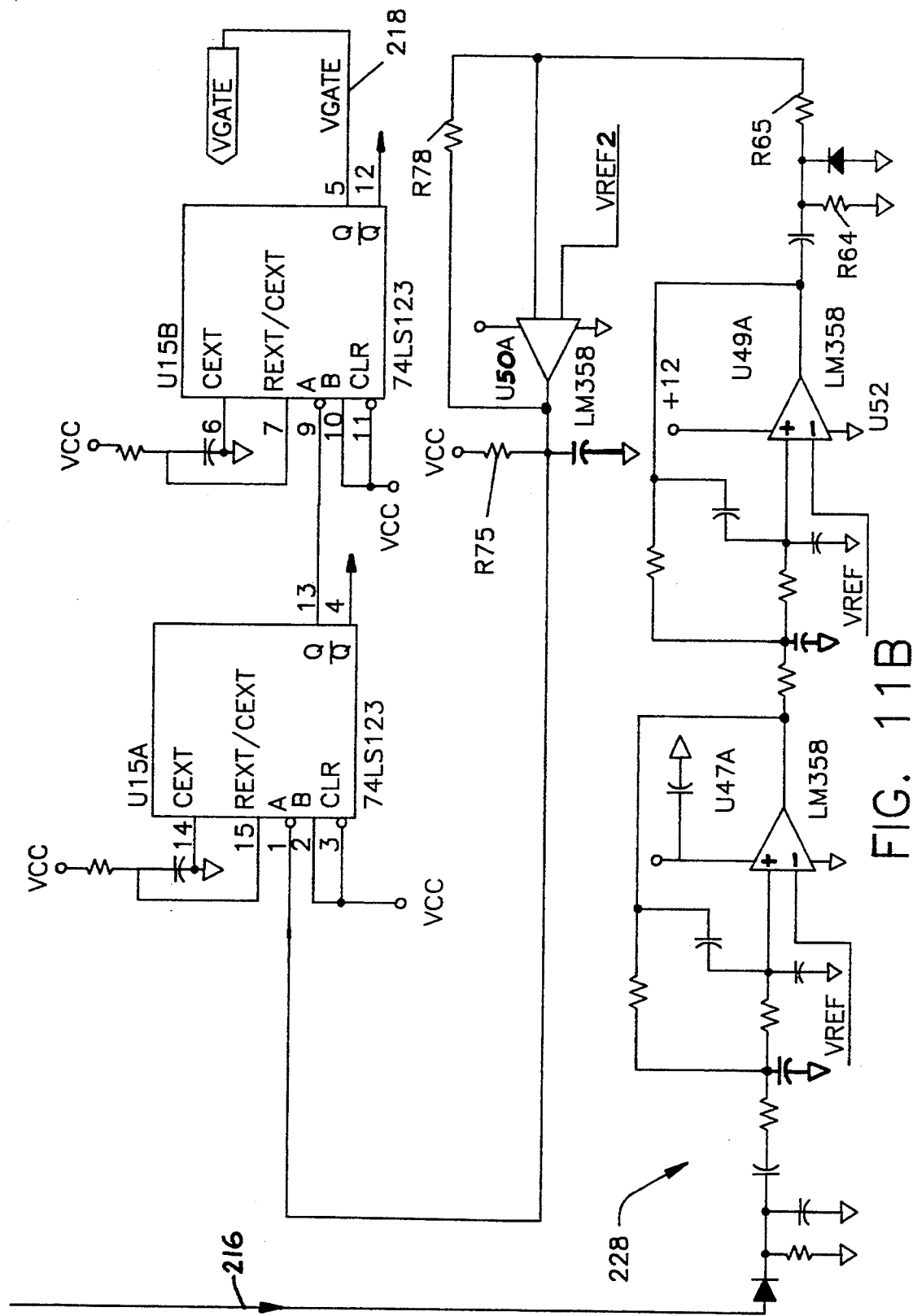

The decoder also includes a computer 140 which is coupled to a computer interface 111 shown in FIG. 11. The computer generates a plurality of control signals including Rec RESYNC and Ch An B which arranges the lines in pairs. The system must know whether the proper line pairs are 1-2, 3-4, 5-6, etc., called A pairing or lines 2-3, 4-5, 6-7 etc. called B pairing.

The computer receives from the interface, signals Data=1 and Data=0 which are program identifying bits generated by the decoder 94. As described above, each program is identified by 40 digital bits. The computer interface has an output terminal T1 which is coupled to terminal T3 of module 107 and transmits a signal AquVSYNC thereto. This signal controls the acquisition of each Vsync. An output terminal T2 of the interface 111 is coupled to an input of a channel separator 108 (shown in detail in FIG. 10) and transmits an AnB signal to the channel separator 108 to control the line pairing. Terminal T3 of the interface receives a Data=0 signal from an output terminal of a data recovery module 110 shown in FIG. 11 and a terminal T4 receives a Data=1 signal from the data recovery module 110.

The output of the differential amplifier 105 is coupled to an input terminal T1 of module 106 which provides an offset and threshold comparison function with the output, an A minus B, or A-B signal, from the differential amplifier 105. Signal B is the last output of the module 102 and signal A is the previous to the last output of the module 102. Terminal T7 of module 107 is coupled to terminal T3 of module 106 shown in FIG. 8 and to terminal T1 of channel separator module 108 shown in FIGS. 10 and 11. Terminal T2 is coupled to terminal T2 of the channel separator 108 and couples an A-B digital signal thereto.

Figure 15A:
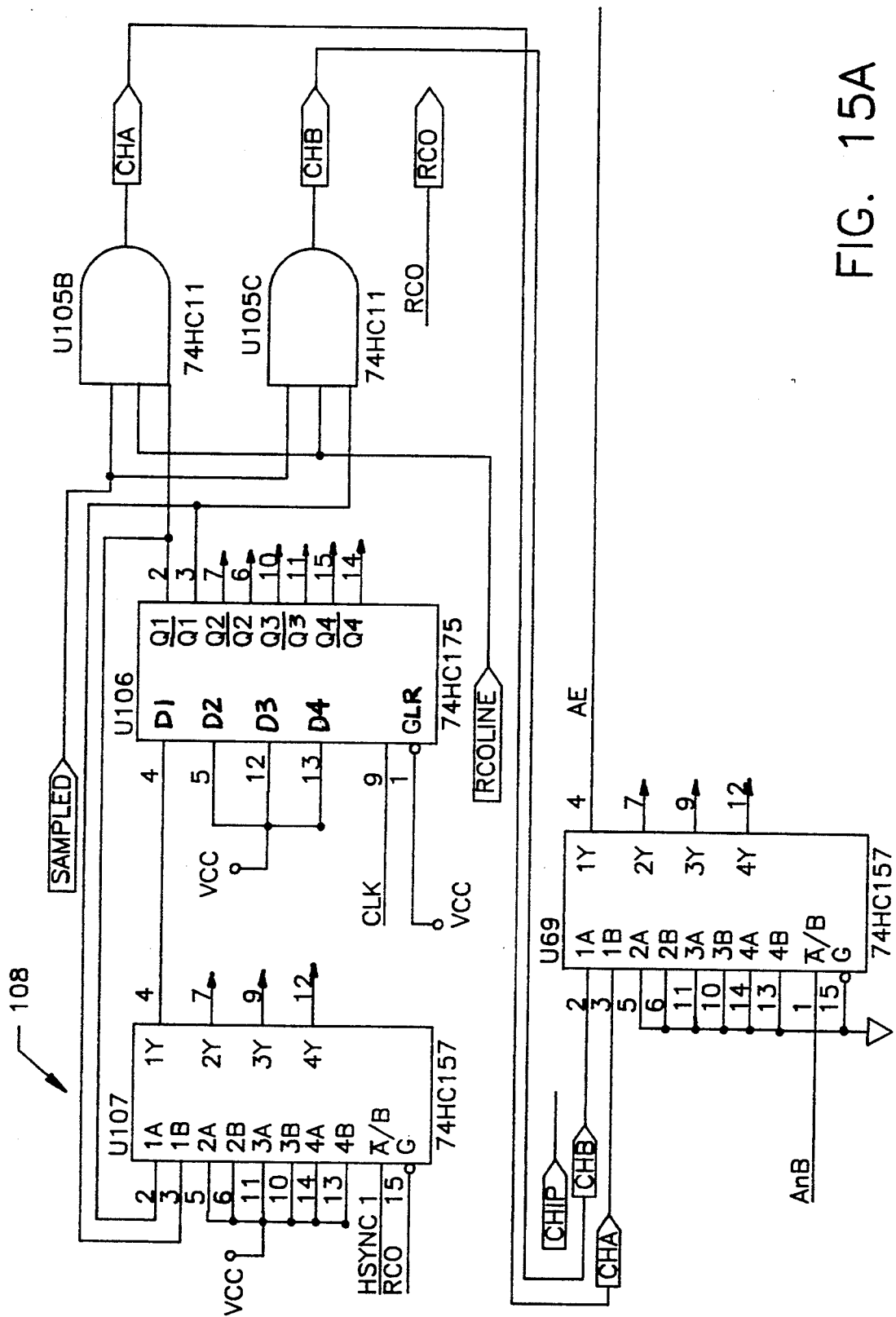
FIG. 15 is a detailed schematic representation of still another portion of the decoder system of the invention.
Figure 15B:
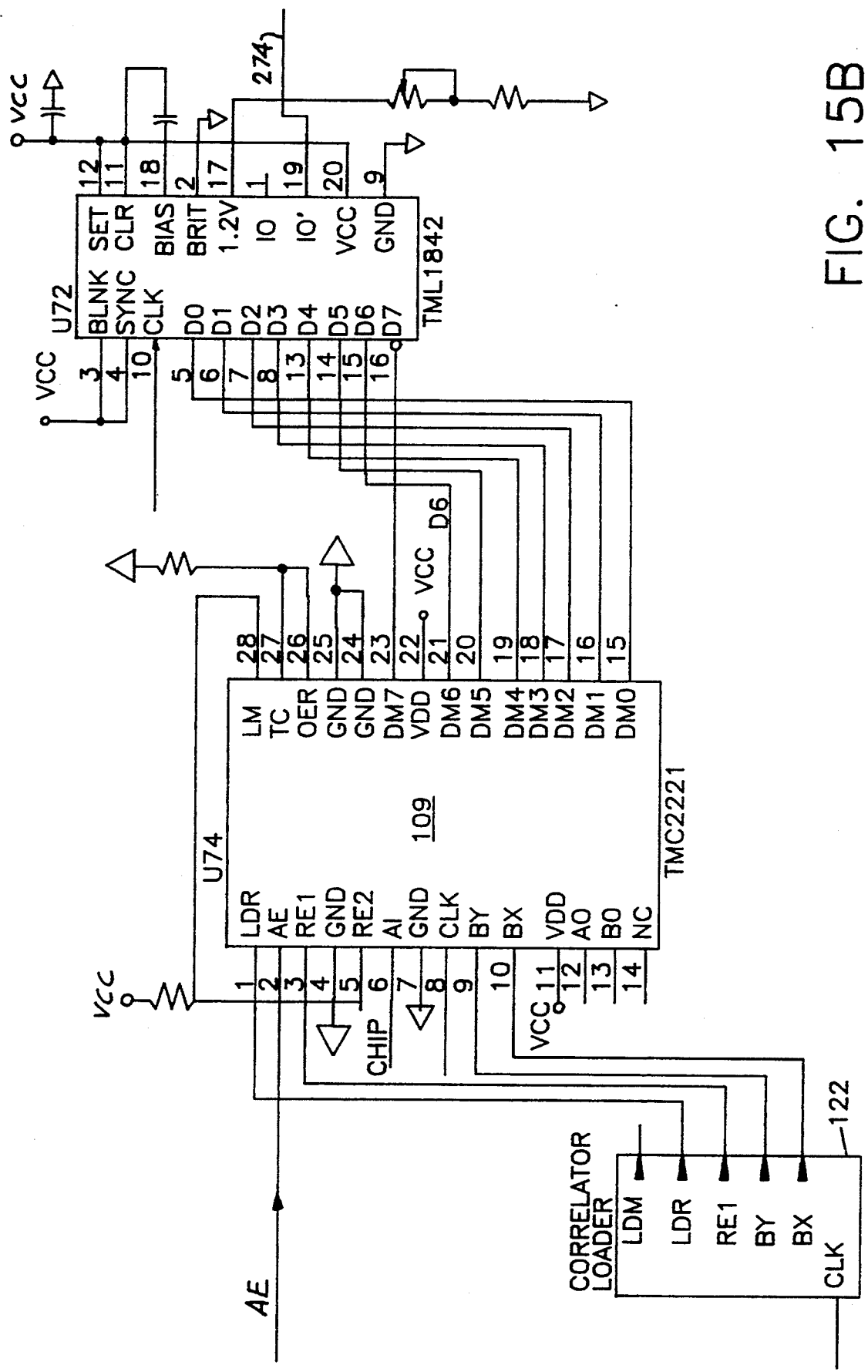
Figure 15C:
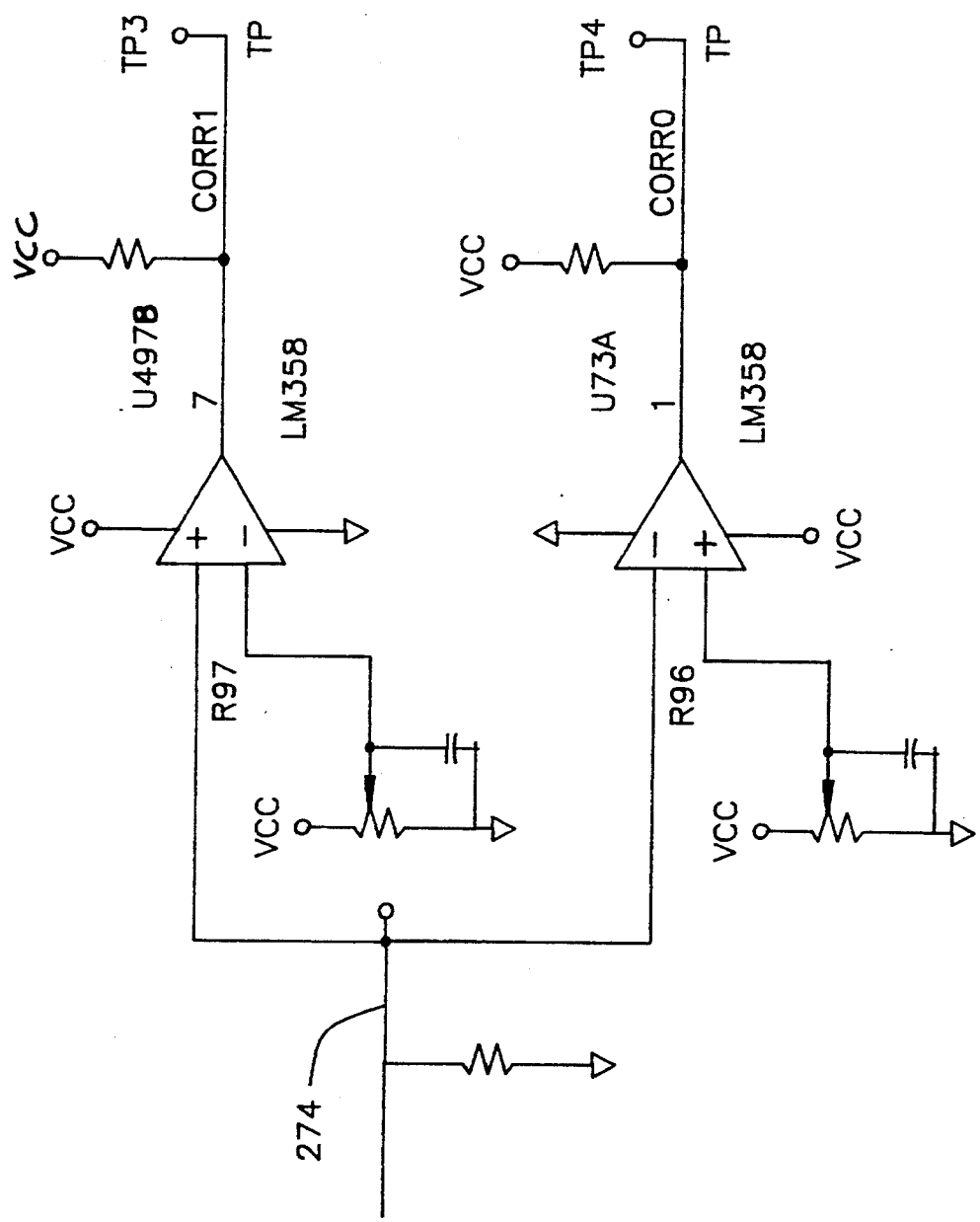

Terminal T4 of the channel separator 108 is coupled to terminal T1 of a digital correlator module 109 shown in FIG. 15 and couples a Chip signal thereto. Terminal T5 of module 108 is also coupled to terminal T2 of module 109 shown in FIG. 11 and couples an AE signal thereto. The AE signal, an enable signal, enables the correlator 109 to one or the other of the "A" or "B" pairing of lines.

Figure 16A:
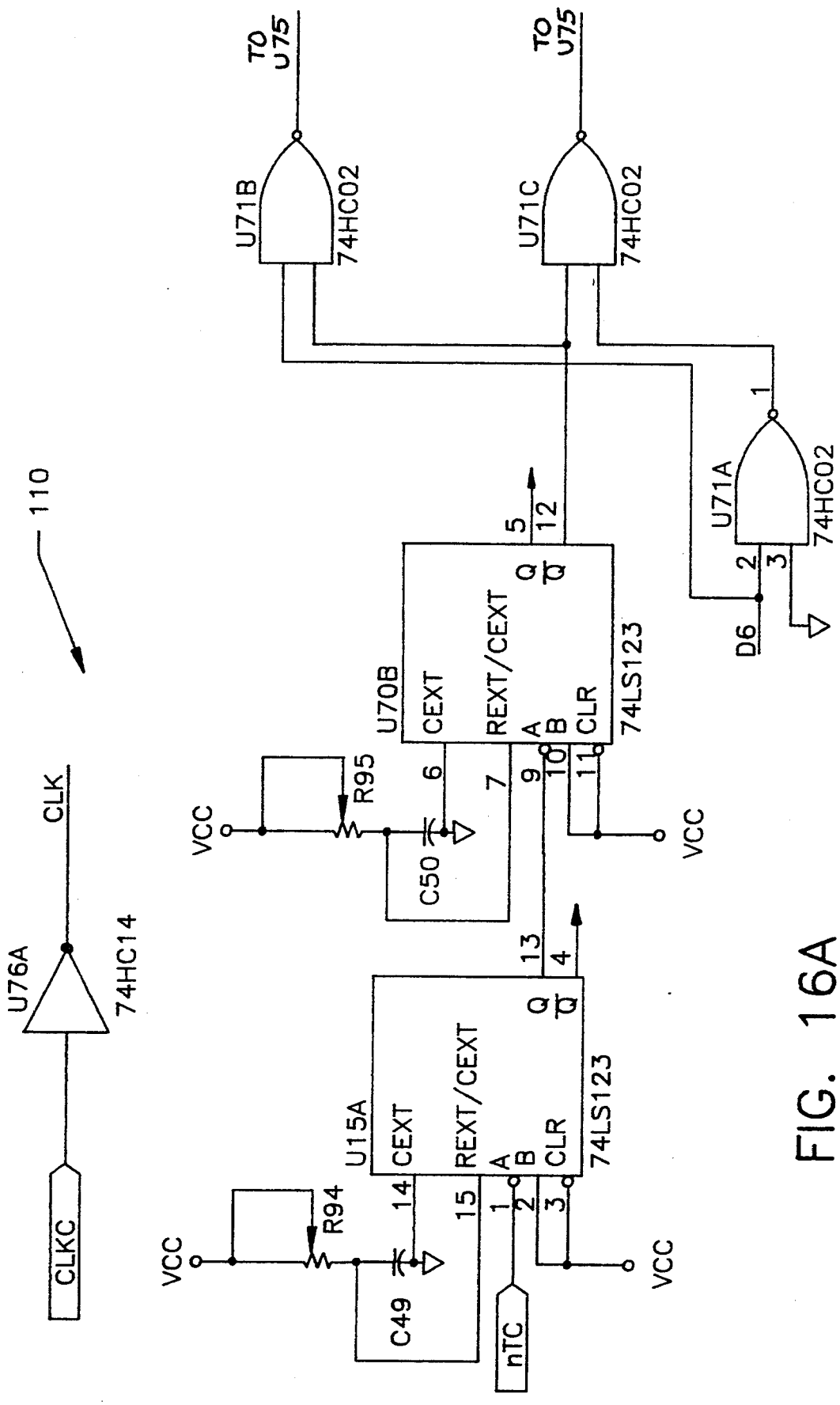
FIG. 16 is a detailed lschematic representation of yet another portion of the decoder system of the invention.
Figure 16B:
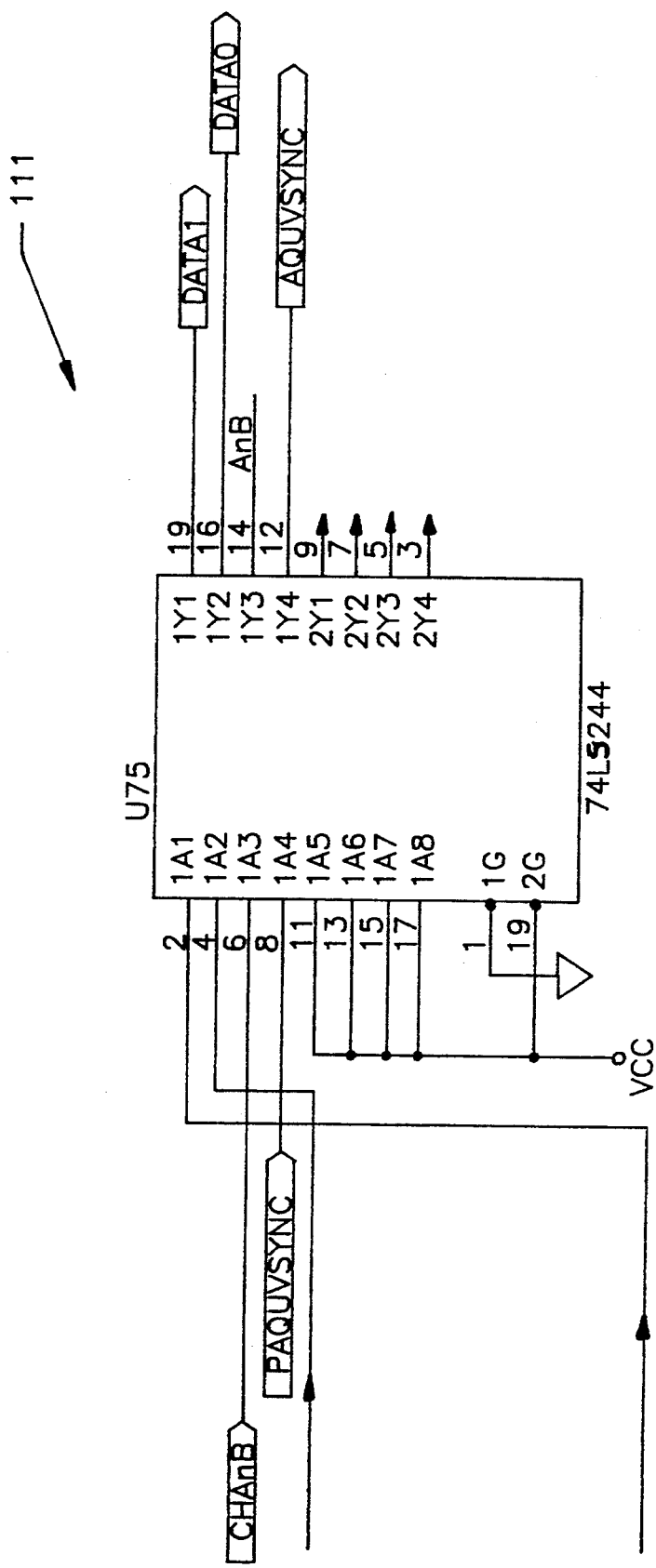

The digital correlator 109 has terminal T3 coupled to terminal T1 of the data recovery module 110 shown in FIG. 16.

FIGS. 8–17 show some of the components of the decoder system in greater detail.

Figure 9:
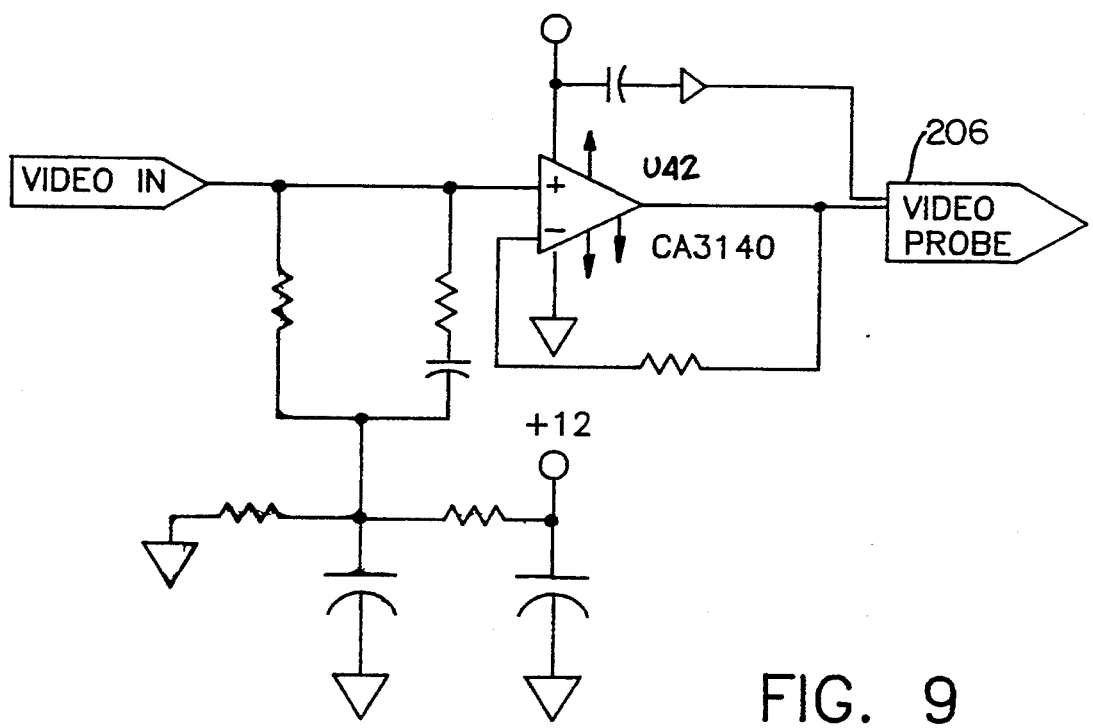
FIG. 9 is a detailed schematic representation of another portion of the decoder of the invention.
Figure 10:
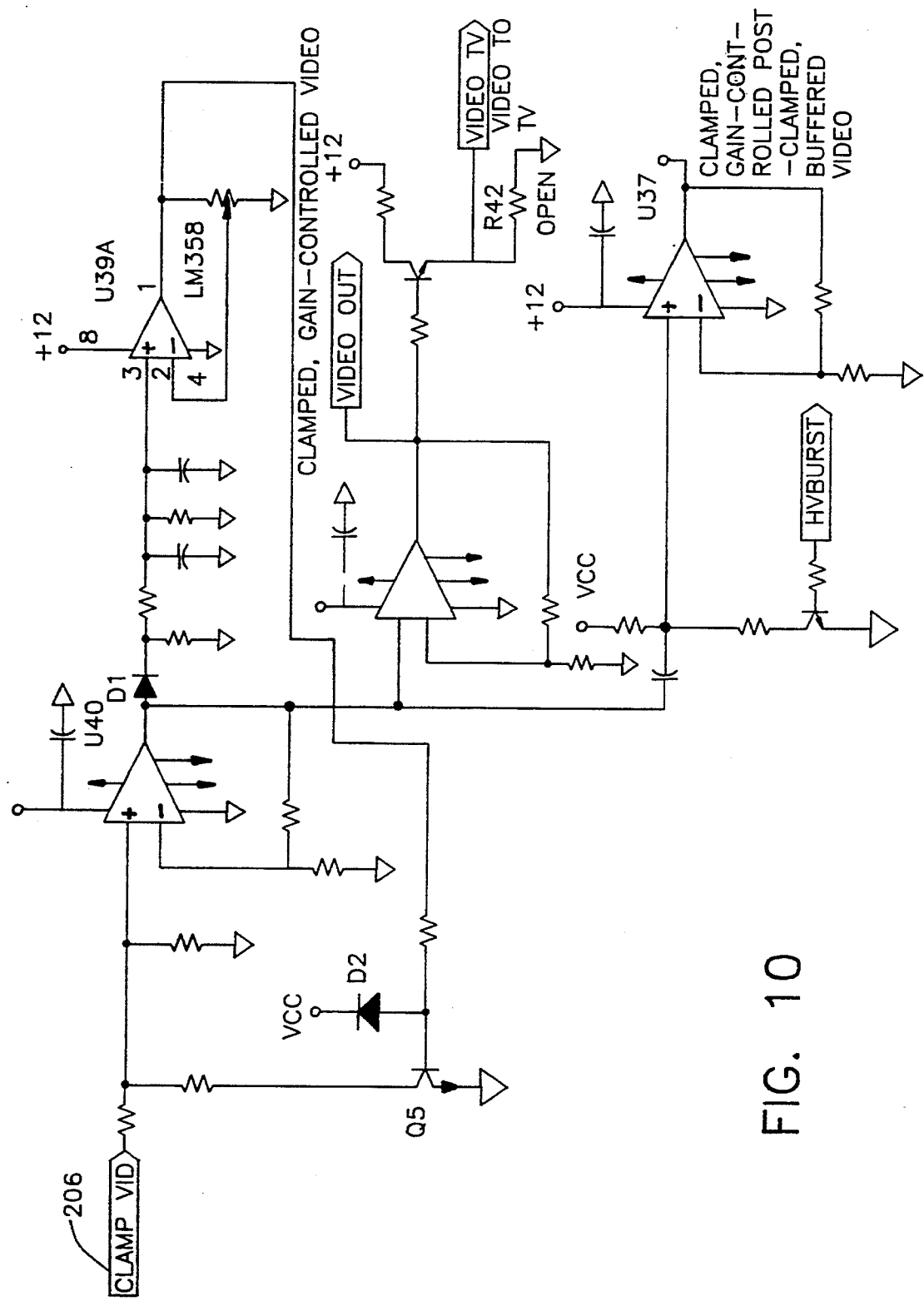
FIG. 10 is a detailed schematic representation of still another portion of the decoder of the invention.

FIGS. 8, 9 and 10 show details of the probe wire and its circuitry used in the decoder. The circuitry associated with the probe wire 210 is conveniently mounted on a one inch square of insulating board material 202. The insulating board 202 carries a copper ground plate 204 on the surface thereof opposite the surface on which the circuitry 208 is mounted. In one arrangement, the probe wire 210 consists of a two inch length of #24 insulated wire connected directly to the input of a high input impedance, unity gain amplifier U42 (FIG. 9). The output of the probe circuit is connected to a shielded cable 206 which is coupled to the module 101 shown in FIG. 3. The probe electrostatically senses the voltage potential between the wire and the ground plate 204 and thus couples the picture signal from the picture tube 212.

Referring to FIG. 9, resistor R45 provides a path for leakage current and resistor R46 and capacitor C17 provide equalization to compensate for the probe wire's frequency response.

Referring to FIGS. 9–11, the shielded cable 206 is coupled to amplifier U45 (FIG. 11) and its associated circuitry of which circuits U39 and U46 are buffers. Circuit U47A (FIG. 11) is a comparator which detetcts when the video signal from circuit U39B falls below a threshold votage set by resistors R53 and R54. Circuit U47A recovers Hsync. Circuits U48A and U48B filter false triggering signals and circuits U47 and U49A are low pass filters which recover V sync from the video signal. Circuit U50A is a comparator that detects when the output of circuit U50A exceeds VREF2. Circuits U51A and U51B filter false triggers. Circuit elements Q6, R70, R64 and U44A and U44B clamp the video signal. The clamp video is gain controlled by circuits U40, U39A and Q5 and the associated components (FIG. 10). Circuit U38 buffers the video signal to module 101.

Figure 14A:
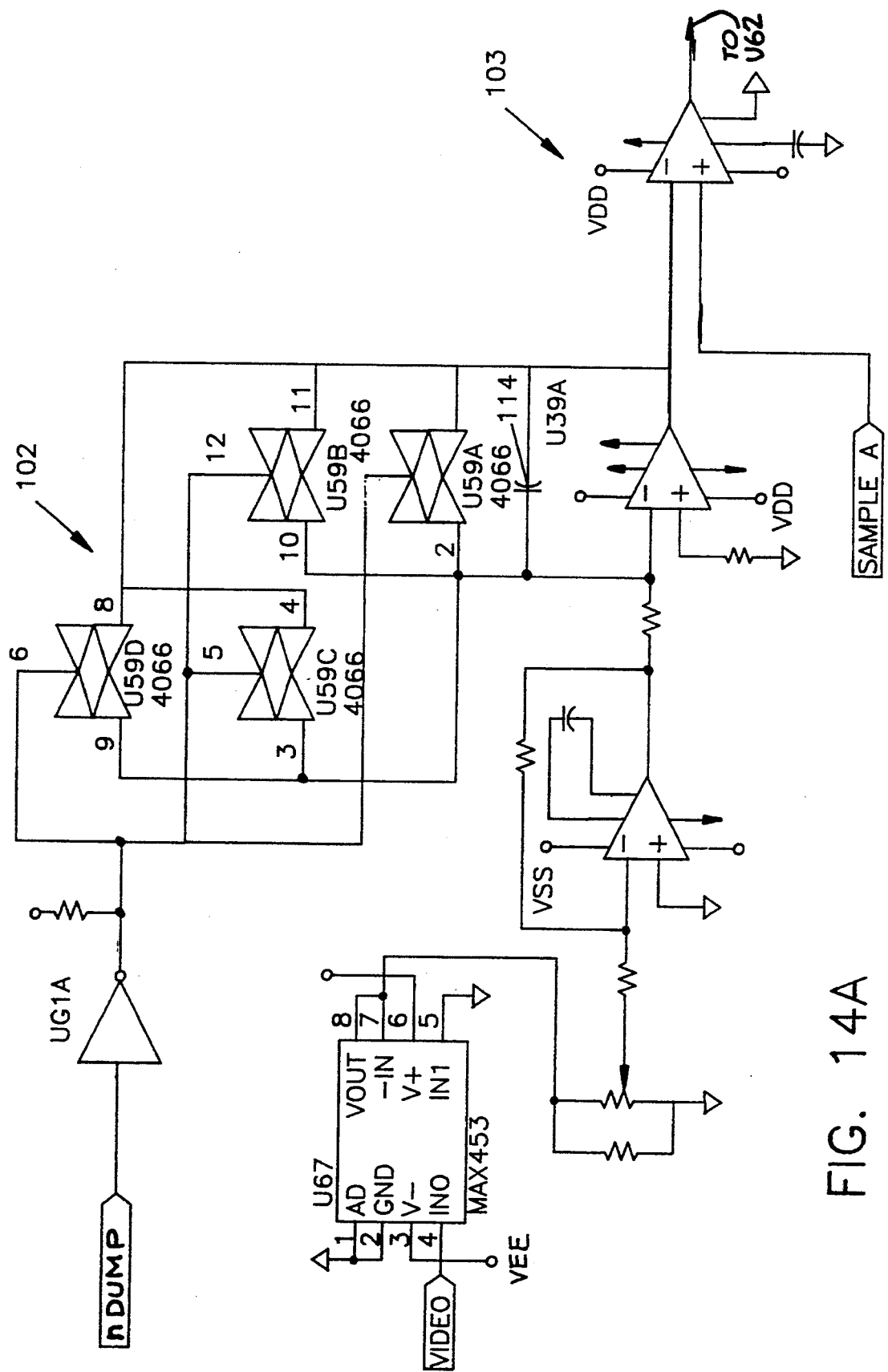
FIG. 14 is a detailed schematic representation of still another portion of the decoder system of the invention.
Figure 14B:
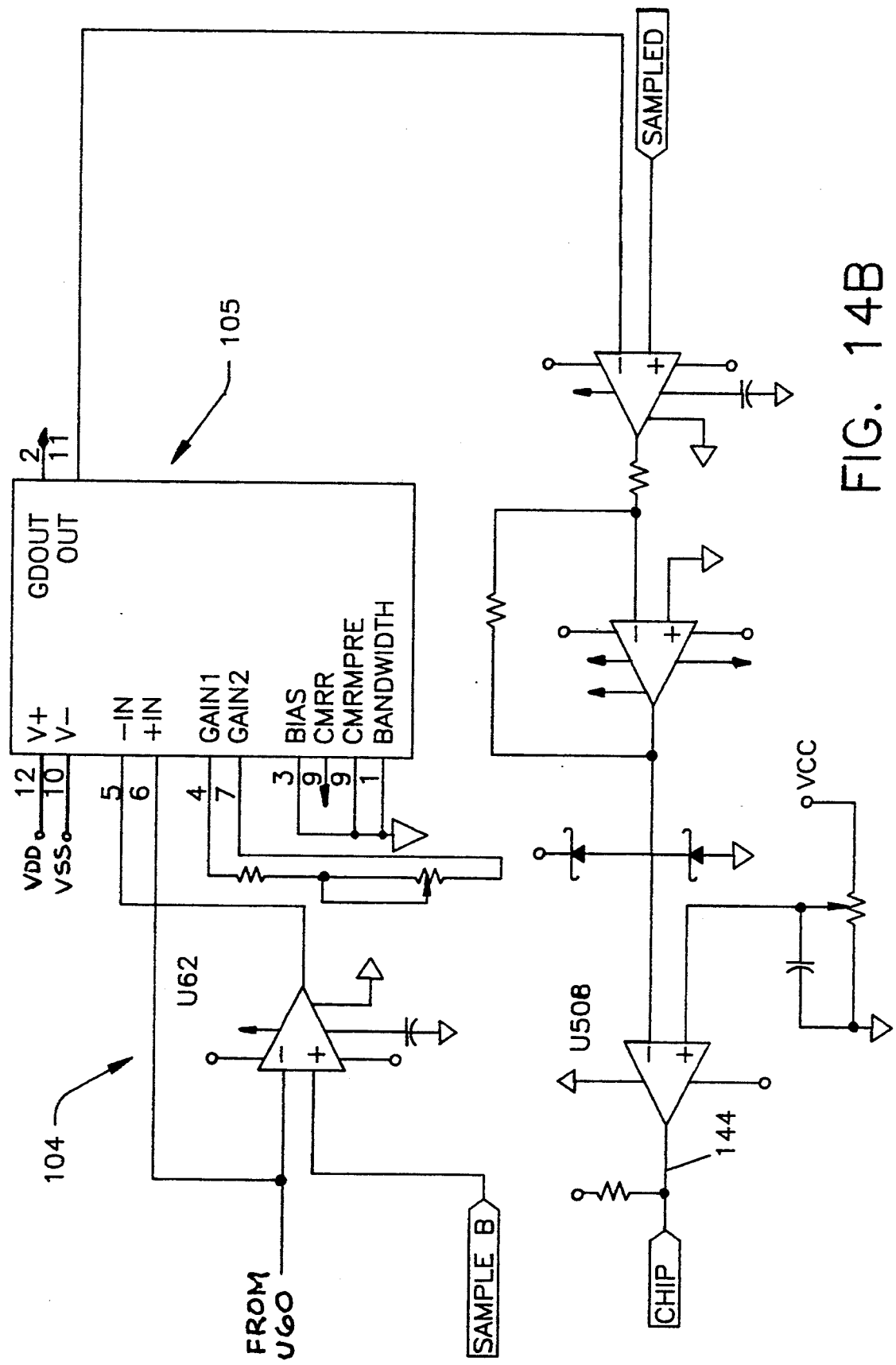

FIG. 14 shows decoder module 102 (FIG. 3), the integrate and dump module, with the video program signal coupled to circuit U67. The luminance video signal is buffered in module U67 and then coupled to the associated circuitry in which it is integrated in capacitor 114 and then moved into store and hold circuits U60 and U62 which are decoder modules 103 and 104 (FIG. 3), respectively. Both U60 and U62 are coupled to decoder module 105 (FIG. 3), differential amplifier U63.

The output of differential amplifier U63, which is the difference between the signals, that is the horizontal line pair signals, in circuit U60 and that in circuit U62, is coupled to module 106, the offset and threshold comparison circuit which is made up of amplifiers U64, U65 and U50B to provide on lead 144 a Chip signal a digital 1 or 0. The A-B voltage is stored in amplifier U64. Module 106 compares the analog signal from differential amplifier 105 plus an offset from circuit U65 with a threshold voltage provided by resistor R90 and comparator U50B and forms a digital "0" or "1" which appears on lead 144. Each program field line which is processed produces a chip bit on lead 144.

Figure 12A:
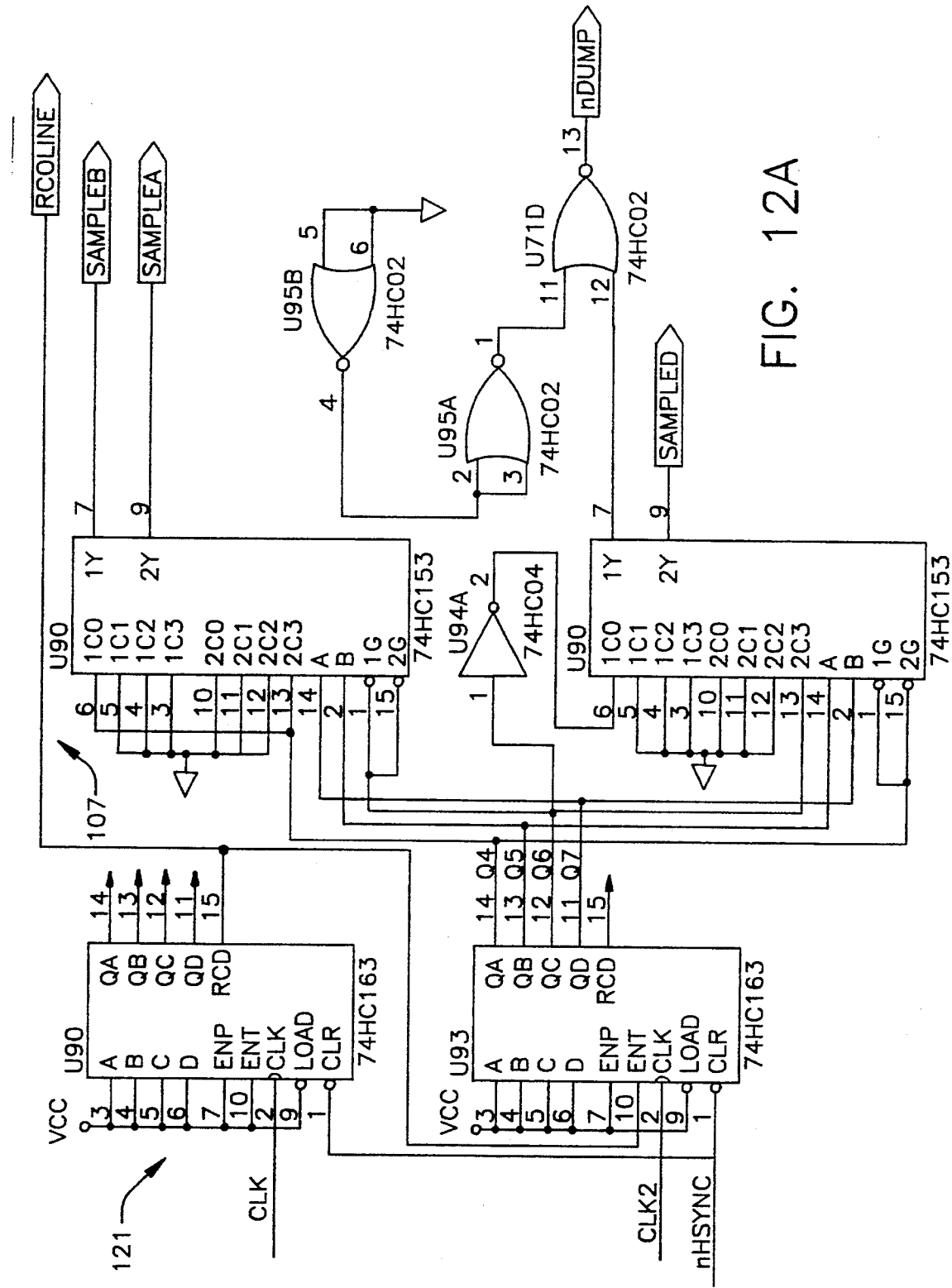
FIG. 12 is a detailed schematic representation of still another portion of the decoder of the invention.
Figure 12B:
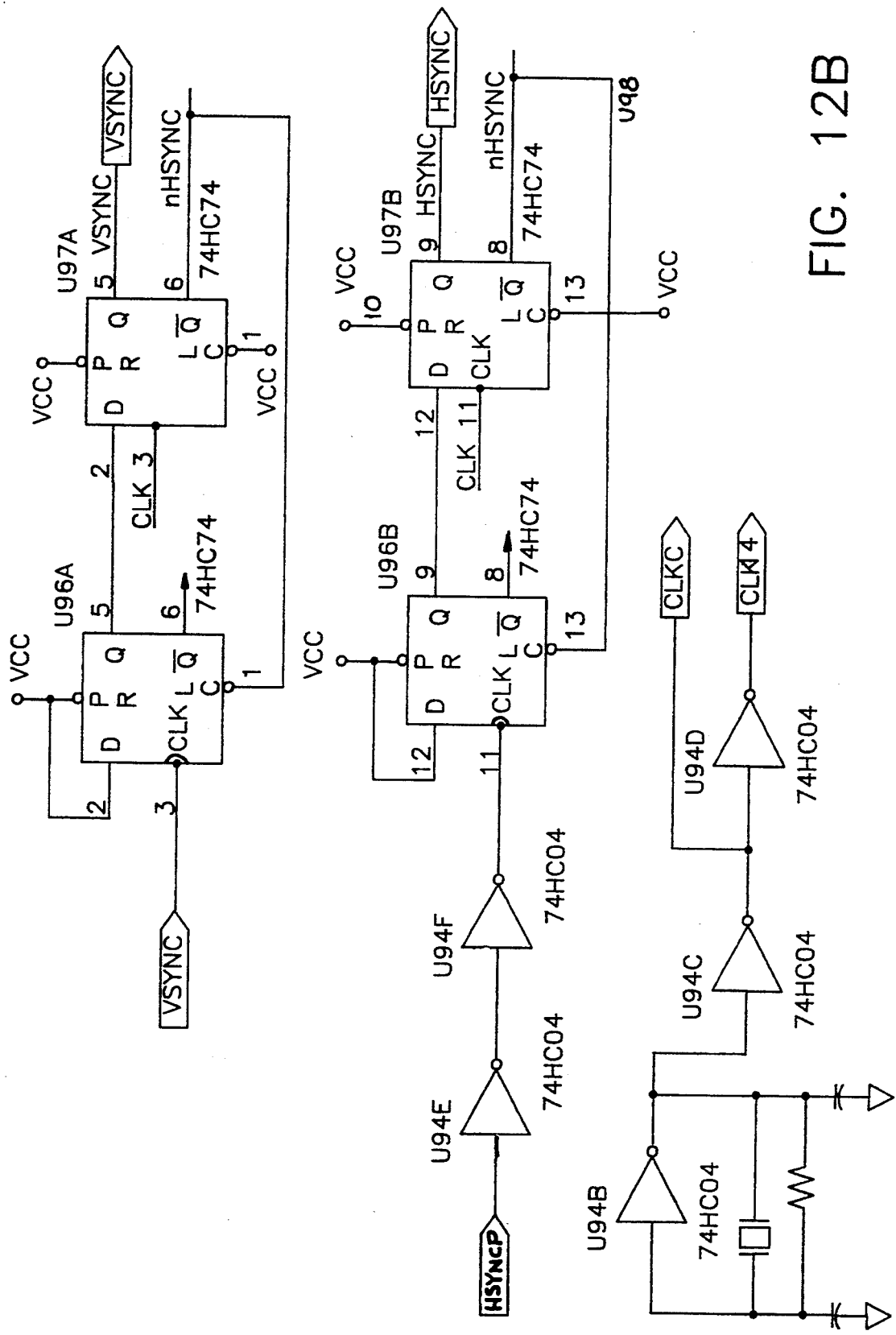
Figure 13A:
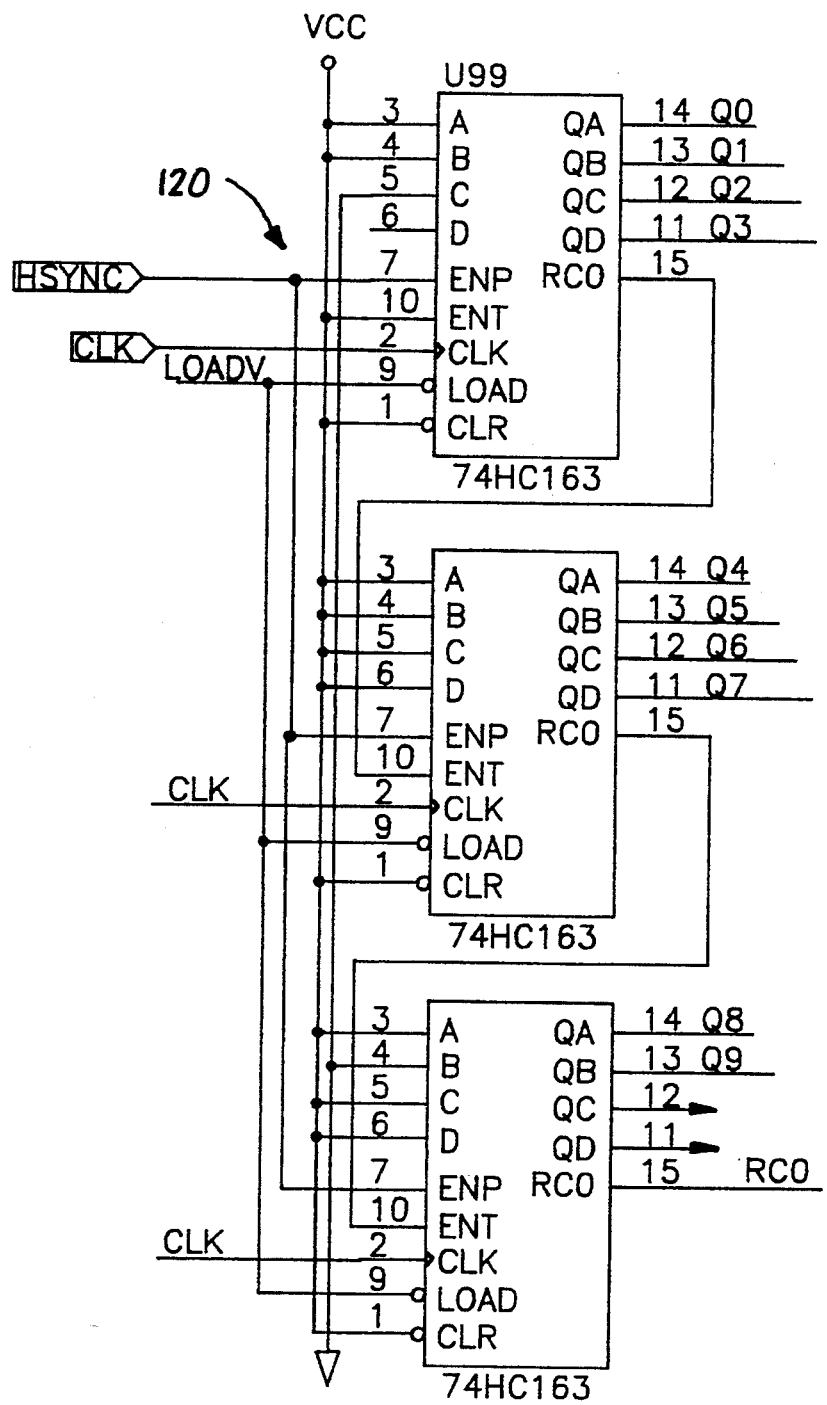
FIG. 13 is a detailed schematic representation of another portion of the decoder of the invention.
Figure 13B:
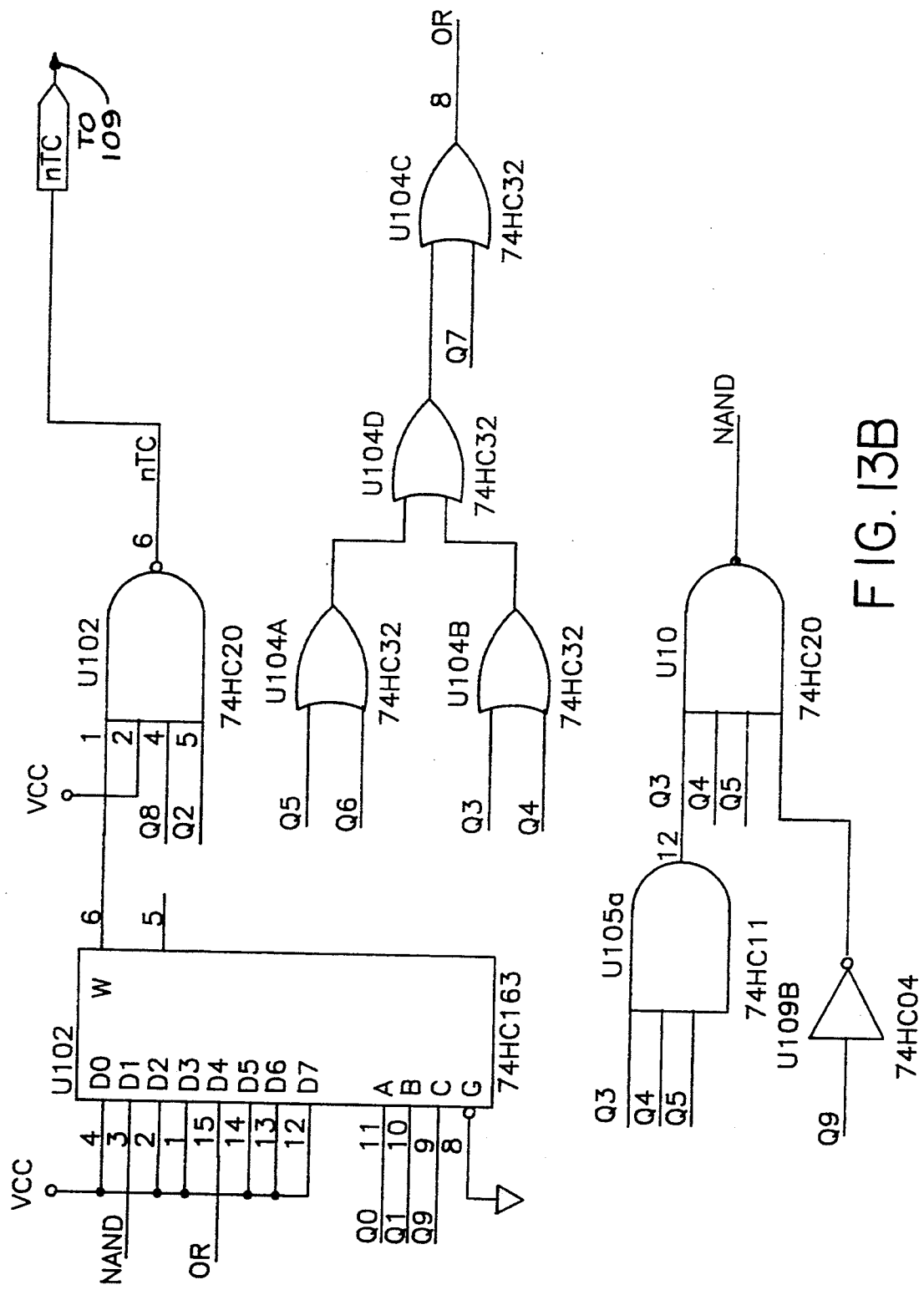
Figure 13C:
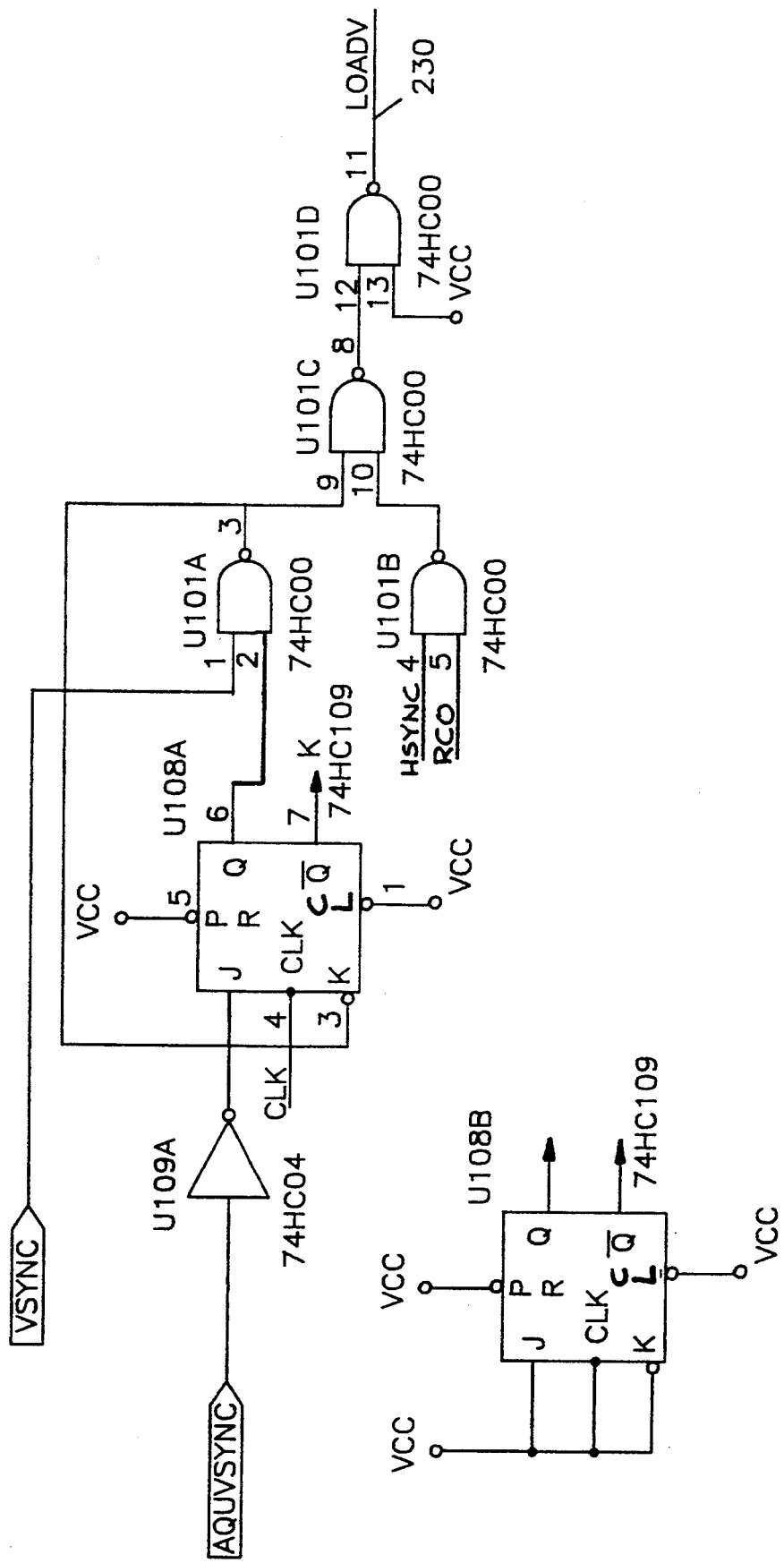

FIGS. 12 and 13 show details of decoder module 107 (FIG. 3) which provides timing and control functions and essentially processes the vertical and horizontal sync signals to perform the desired timing and control functions with respect to determining the lines and fields of video information and the start of the processing of field lines.

FIG. 13 shows a counter 120, which is a portion of timing and control module 107, and counts the lines of a frame from 0 to 524. Circuits U99, U100 and U101 and gates 110B–110D form a divide by 525 counter. A signal RCO out of counter module U101 signals the 525th line of video. The divide by 525 counter is initialized by the vertical sync signal (Vsync) recovered by the probe circuit when the computer enables resynchronization by way of the AquVSync signal derived from the computer through interface 111. Circuits U109A, U108A and associated gates generate the reset, Load V, signal on lead 230.

When signal AquVsync is active, the next Vsync resets counter 120 and the outputs of the counters is decoded to provide the signal nTC, the expected time of correlation. this signal nTC is used to recover data from the output of the correlator module 109 (FIG. 15).

Circuits U109A, U108A and associated gates generate the counter reset signal, Load V, on lead 230 when signal AquVsync and Vsync are received (FIG. 13).

Referring to FIG. 12, circuits U90 and U93 form a counter that divides the current line of video into approximately 255 time bins. The output of the counter is decoded to coordinate the integrate and dump filter and the sample and hold filters U91, U94A U92 and U71D decode the counter output. Circuits U91 and U92 generate the sample A, sample B and sample D signals shown in FIG. 3.

FIG. 15 shows components of decoder channel separator module 108 (FIG. 3) including circuits U107 and U106 which form a divide by 2 counter which enables the count at the beginning of a line of video by Hsync and is cleared at the end of a frame by signal RCO. The output of the counter is gated with signal RCO and sample D signal to form signals CHA (Channel A) and CHB (Channel B) at gates 105B and U105C. Multiplexer U69 selects CHA or CHB as the correlator enable signal. The multiplexer is controlled by signal AnB which is generated by the computer via the interface 111.

The output AE (A enable) from circuit U69, along with outputs from a correlator loader module 122, are fed into module 109, the digital correlator which is U74 a THC2221 circuit made by TRW. The output of U74 is fed to U72 digital to analog converter which converts the digital correlator's output to an analog voltage.

The output of circuit U49B will go high if its input from the digital to analog converter exceeds the reference voltage set by R96. The output of U73A will go high it its input from the digital to analog converter 72 is below the reference voltage set by R96. The outputs of U49B, when high, represents an information bit equal to "1" and the output of U73A, when high, represents an information bit equal to "0". These are available as test points.

Figure 17A:
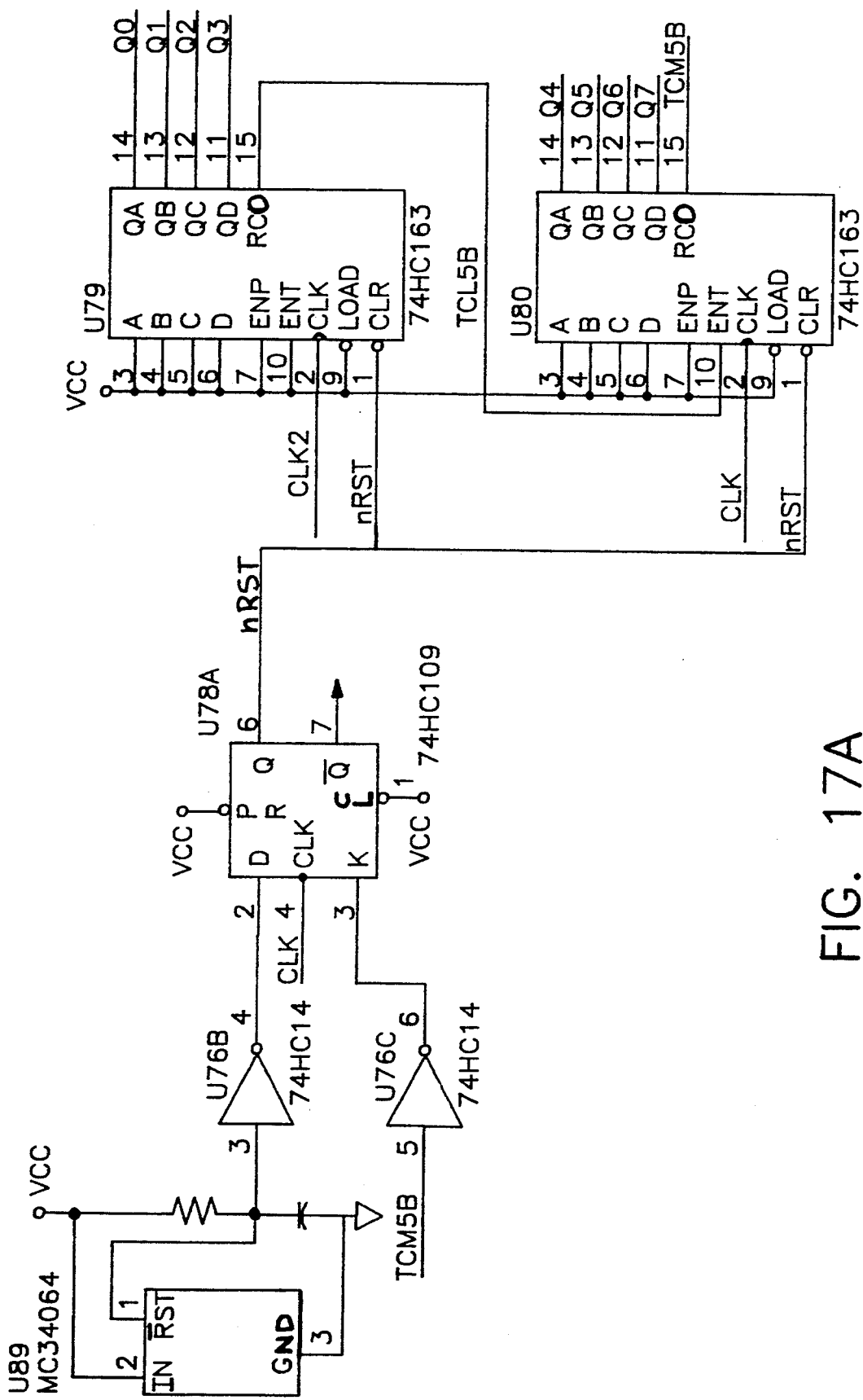
FIG. 17 is a detailed schematic representation of another portion of the decoder system of the invention.
Figure 17B:
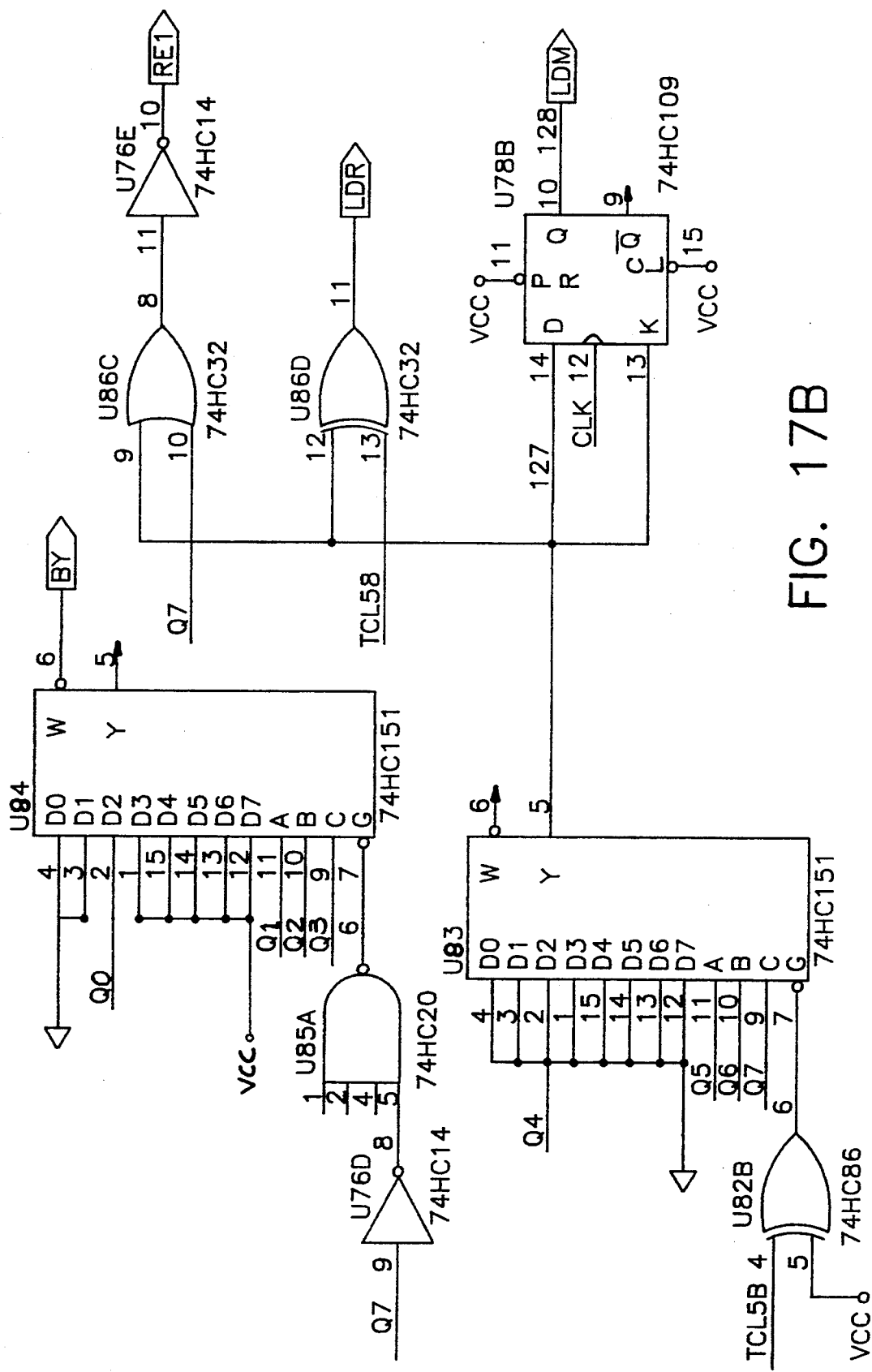
Figure 17C:
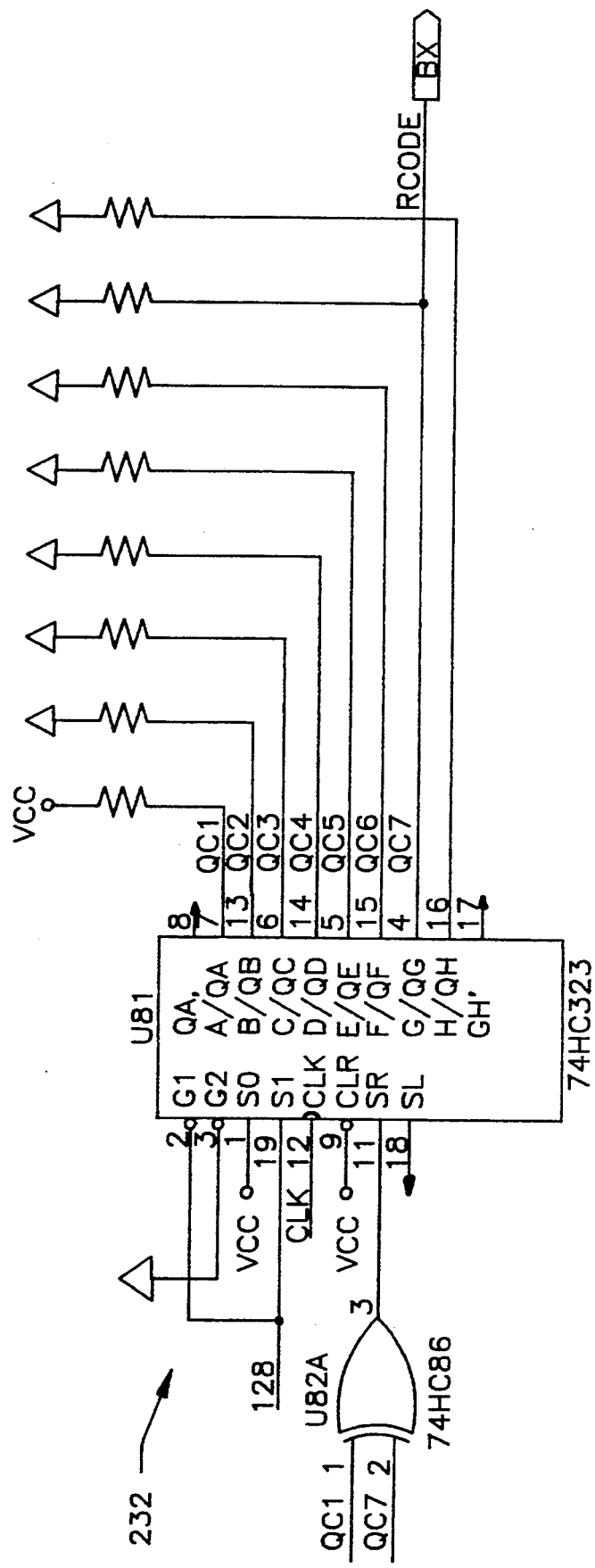

FIG. 17 shows the code generator 232 used in the decoder system. The code generator is loaded with the same code generated by the code generator shown and described above in the encoder system. The code generator is made up of circuit U81 and its associated circuitry. The output of the code generator Bx is clocked into the correlator 109 shown in FIG. 15. Signal RE1 is a clock enable that enables the code into the correlator.

FIG. 16 shows data recovery module 110 which includes multivibrator circuits U70A and U70B and module 111, part of the computer interface. Circuits U70A and U70B are initiated by signal nTC, the expected time of correlation. Resistors R94 and R95 are adjusted to provide a signal aligned with the correlator's output. Circuits U71A, 71B and 71C are used to gate the correlator's output with the output of circuit U70B. If the D6 output of the correlator is low, it represents a data bit "0" and if D6 is high it represents a digital "1". Circuits U71B and U71C and U75 generate the data bits.

The decoder system 94 operates as follows. An encoded but unidentified TV program is transmitted and received by the TV set 100 (FIGS. 3 and 8). As the program plays in normal fashion on the TV set, the composite video signal is picked up electrostatically by the probe wire 210 and it is coupled to amplifier U42.

The composite video signal is amplified and filtered in the circuitry shown in FIG. 9 and it is coupled by shielded cable 206 to amplifier U45 shown in FIG. 11 and processed as described above.

The composite video signal is further processed in the circuitry shown in FIG. 11 where it is processed through amplifiers U45, U39B and U46 to provide the clamped video on lead 220. The composite video signal is also fed on lead 222 to a first path including circuits U47A, U48A and U48B to generate the Hsync signal and to a second path including circuits U47B, U49A, U50A, U51A and U51B to generate the Vsync signal circuits U96A and U97A (FIG. 12) further process the Vsync signal and circuits U96B and U97B further process the Hsync signal.

As each line of the program is received, the video portion is coupled from terminal T2 of module 101 in FIG. 3 to module 102 where the complete luminance line is integrated to form an analog signal. This is shown in FIG. 14 where the video signal appears on lead 224 into circuit U67. This an signal for a first line is integrated across capacitor 114 and is then coupled to amplifier 103 (U60 in FIG. 14) during the horizontal blanking interval and it is held there along with a sample A signal from module 107 (FIG. 12) and then an analog signal is coupled from amplifier 103 to amplifier 104 where it is stored along with a sample B signal from module 107. Meanwhile the next integrated line is fed to and stored in module 103. The outputs of amplifiers 103 and 104 are fed to the A and B inputs of the differential amplifier 105 where the difference between A and B is determined.

The output of amplifier 105 (U63) is fed to module 106 (FIG. 3) where in FIG. 14 it is processed through amplifier U64, U65 and U50B where the analog signal (A-B) is digitized to form a Chip signal which appears on lead 144. The chip signal may be either a digital "1" or a digital "0" depending on whether A-B is positive or negative or odd or even.

A digital chip is generated for each line of a field of the TV program and it is coupled on lead 144 from U50B (FIG. 14) to an input of U74, the digital correlator (FIG. 15). But the operation of the system requires that the lines be processed in pairs. Pairs of lines considered "A" pairing includes lines 1-2, 3-4, 5-6 etc. Pairs of lines considered "B" pairing includes lines 2-3, 4-5, etc. The computer provides a signal AnB to the channel separator terminal T3 to separate the lines into A or B pairings. This process of A and B pairing is necessary because the probe may not be exact in acquiring the vertical sync signal at the start of a field. The computer will try to process the A pair but if the data recovered does not satisfy the computer and does not appear to be good and does not match any valid combinations in the database, the computer tries the B pair. If the B pair is not good, it resynchronizes the system to a new vertical sync signal by way of the AquVsync signal out of the interface 111.

Signal AE, A enable, enables every other chip to obtain the proper pairing of lines.

If the vertical sync signal were always accurately acquired, then proper pairing would always be achieved.

In any case under the control of the computer 140, the system selects, with the AnB signal (FIG. 115), the correct digital signal to enter and store in the digital correlator module 109. For each bit enabled into the correlator, it and the last 119 bits entered into the correlator are compared with the 120 code bits fed to citcuit U74 on power up from the correlator loader 122. The output of the correlator on lead D6 (FIG. 15) tells whether the number match is such as to represent a "1" or "0" output when strobed by the output of circuit U70B (FIG. 16) when D6 is high. This signal is fed into the computer and when signals from forty fields are in the computer, these signals are compared with the signals or bits in the database to determine whether there is a match and what program has been processed.

This process goes on continually for an entire program and the computer continually looks for matches between the information bits generated in the decoder and the information bits stored in the database.

The principles of the invention have been described above including the modulation of adjacent TV lines in a single field of odd numbered lines and then even numbered lines. If is possible however to practice the invention with other line pairings. For example, lines in an odd numbered field could be coupled with lines in even numbered fields by storing two fields in a suitable memory and then accessing adjacent lines in each and processing them as described above. Other systems may also be used.

Figure 18:
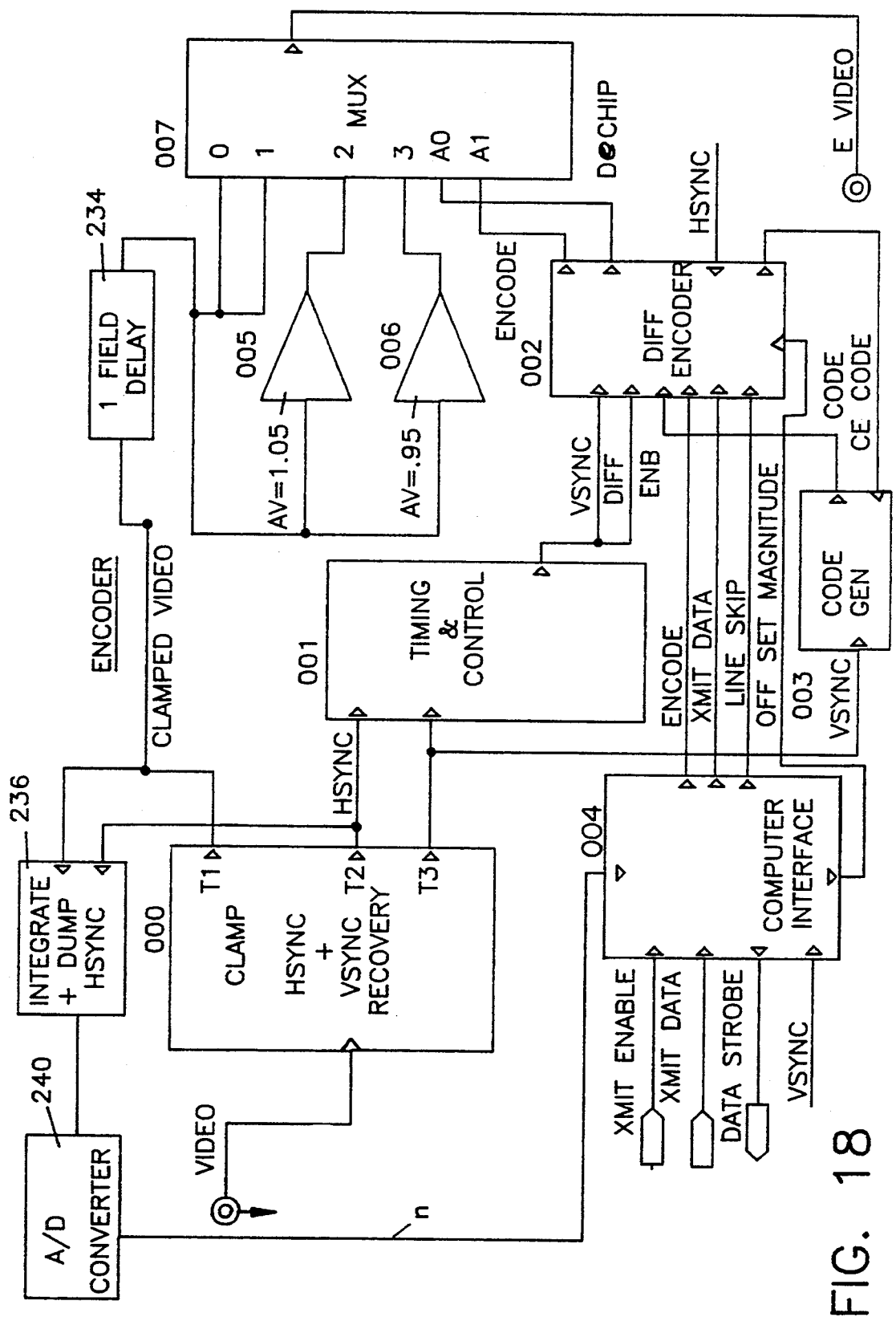
FIG. 18 is a block diagram of a modification of the encoder system of the invention.
Figure 19:
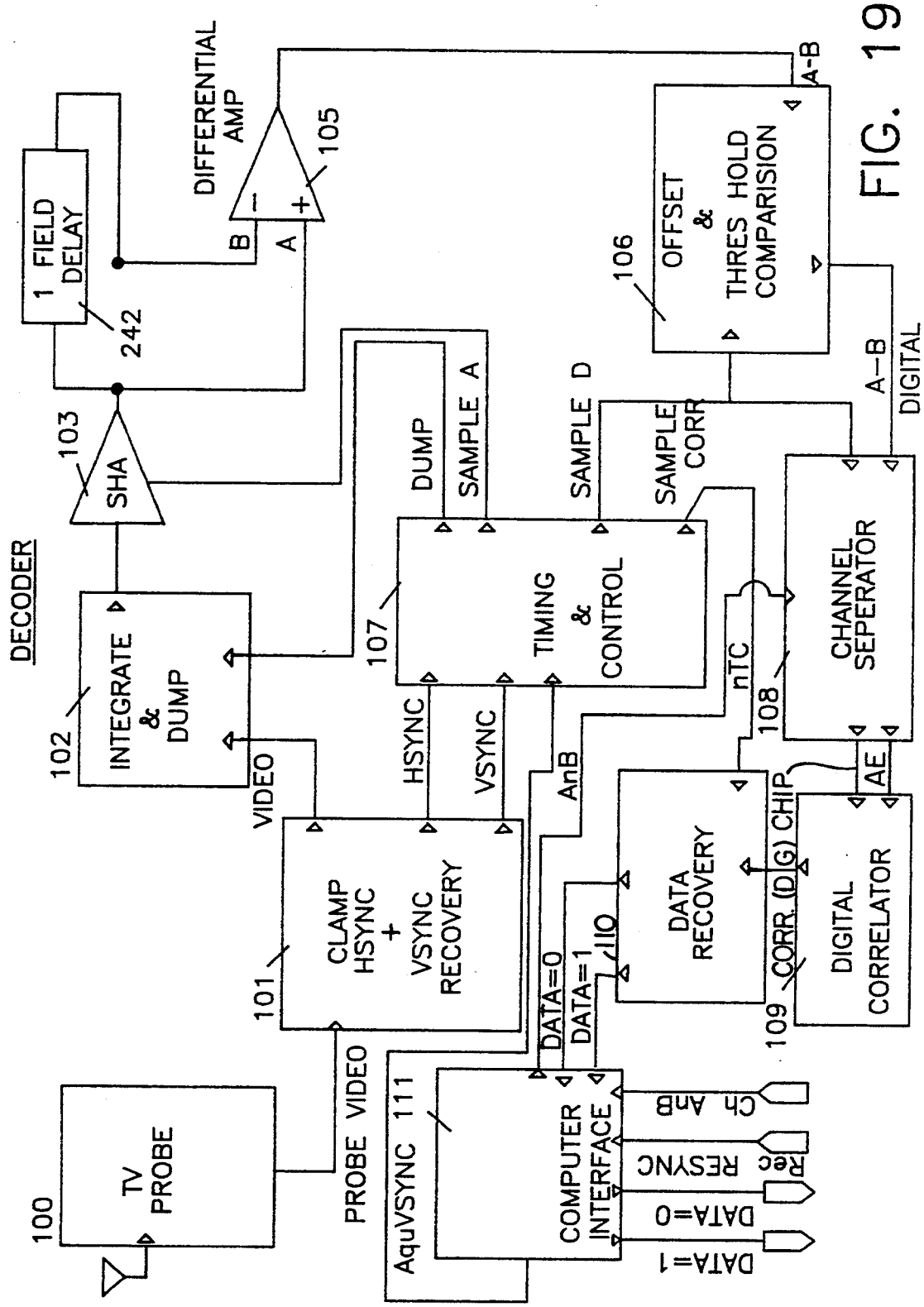
FIG. 19 is a block diagram of a modification of the decoder system of the invention.

FIGS. 18 and 19 show the encoder and decoder systems described above modified to carry out the principles of the invention with intraframe operation rather than intrafield operation as described above. The system shown in FIG. 18 delays the comparison of the video lines for one field. The modification includes a delay module 234 inserted between terminal T1 of module 000 from which the clamped video is fed to the inputs to amplifier modules 005 and 006. An integrate and dump module 236 is also connected to the T1 terminal of module 000 and to the Hsync terminal T2. An analog to digital converter is also connected between the module 236 and the computer interface 004. A line skip signal connection and an offset magnitude connection extends from the computer interface to the differential encoder 002.

In the decoder system shown in FIG. 19, the output of amplifier 103 is connected through one field delay module 242 to the B input of differential amplifier 105. Amplifier module 104 is omitted in FIG. 19.

In the encoder, the integrate and dump circuit 236 and the analog to digital converter 240 inform the computer by way of the computer interface as to how well a pair of lines in adjacent fields match for processing purposes. The line skip signal allows the encoder to skip encoding a line and the offset magnitude signal allows the encoder to control the amount of modulation on a line basis.

In practising the present invention, optimum operation occurs when the luminance between adjacent lines to be modulated is not too great. Thus, the modification of the invention which uses interframe line selection is desirable because where a major visual change exists between two lines, the system can take alternate action such as by neglecting that line pair, by increasing the modulation to overcome the difference or by encoding somewhere else in the picture. The decoder must take the same action if lines are skipped. It must also have a memory to process the lines on an intraframe basis.

What is claimed is:

1. A method of identifying a TV program transmission comprising the steps of
generating a plurality of groups of digital identifying (ID) bits, each group representing a TV program, and storing said group of identifying digital bits in a database,
receiving a TV program transmission comprising a plurality of fields of information including picture information disposed in individual lines, a plurality of adjacent lines of each field having the luminance thereof modulated in amplitude, one line of luminance being brightened and the other line of luminance being darkened, the modulation process including the combining of said digital ID bits from one of said groups with code digital bits,
reconstituting said TV program with said pairs of lines of modulated luminance,
transmitting said reconstituted TV program to a TV set,
extracting said TV program from said TV set,
extracting said pairs of lines of modulated luminance therefrom,
extracting said digital ID bits from said pairs of lines of modulated luminance, and
comparing said plurality of digital ID bits with said groups of digital ID bits in said database to find a match and to thereby identify said TV program.

2. The method defined in claim 1 wherein said TV set includes a picture tube and said step of extracting said TV program comprises placing a wire adjacent to the picture tube of said TV set, said wire extracting the TV program signal electrostatically from said picture tube.

3. A method of identifying a TV program comprising the steps of
forming a database of a plurality of TV programs, each program being represented in the database by a group of digital identifying ID bits,
forming a group of digital code bits,
receiving a TV program transmission comprising a plurality of fields of information including picture information,
processing a plurality of pairs of adjacent lines of a field by modulating the luminance of each line using one of said digital ID bits and a different digital code bit for each pair of lines of a field,
repeating said processing step for each field of a TV program using a different digital ID bit for each field,
reconstituting said TV program with said lines of modulated luminance,
transmitting said reconstituted TV program to a TV set,
extracting said TV program from said TV set,
processing the pairs of lines of each field of said TV program to extract the digital ID bits from each of the same pairs of lines which had been originally modulated, and
comparing the extracted digital ID bits with digital ID bits in said database to determine the identity of the TV program.

4. The method defined in claim 3 wherein in said step of processing a plurality of pairs of adjacent lines, (1) the first of said digital ID bits and the first code bit from a code bit generator are combined for the first and second lines of the first pair of lines, (2) the first of said digital ID bits and a second bit from said code generator are combined for the second pair of lines, (3) the first digital ID bit and a third bit from said code generator are combined for the third pair of lines and so forth until a plurality of pairs of lines of the first field are processed and
repeating said processing of pairs of lines for successive fields using the same digital bit for each pair of lines of the field with a different bit from said code generator for each pair of lines.

5. The method defined in claim 4 wherein line pairs of forty fields of a TV program transmission are processed, with each pair of lines in a field processed by the combination of the same digital ID bit with a different bit from said code generator, the bits from the code generator being different for each pair of lines in a field but the same for the corresponding pairs of lines of forty each field.

6. The method defined in claim 5 wherein 120 line pairs are processed for each of said forty fields.

7. The method defined in claim 5 wherein 120 line pairs are processed for each of said forty fields and the digital identifying ID bits are forty in number and the code bits from said code generator are 120 in number, one for each line pair.

8. The method defined in claim 4 wherein said line pairs are made up of adjacent lines in a field.

9. A method of identifying a TV program transmission comprising the steps of
receiving a known TV program transmission,
encoding pairs of lines of luminance information of fields of said known TV program with a selected code system by alternately brightening and darkening said pairs of lines, reconstituting said TV program with said encoded pairs of lines included, transmitting said reconstituted TV program to a TV set, extracting said reconstituted TV program from said TV set, extracting said encoded pairs of lines from said reconsituted TV program, processing said encoded pairs of lines with said code system to extract digital ID bits therefrom and reading said extracted digital ID bits to determine therefrom the identity of said TV program transmission.

10. A system for identifying a TV program transmission comprising a computer including a database made up of groups of digital ID bits, each group of digital ID bits identifying a specific TV program, an encoder system including means for encoding the luminance of pairs of lines of a plurality of fields of a TV program transmission, in each pair the luminance of one line being increased and the luminance of the other line being decreased, the luminance change for each line being controlled by one of said digital ID bits and a code bit, first means receiving said encoded pairs of lines and reconstituting the original TV program transmission with said encoded pairs of lines included, second means receiving said reconstituted TV program, third means extracting said encoded pairs of lines and further extracting said code bit therefrom and fourth means in said computer reading said extracted code to determine the identity of said TV program transmission.

11. The system defined in claim 10 wherein said means for encoding processes a plurality of pairs of lines of a field of said TV program transmission.

12. The system defined in claim 10 wherein said means for encoding processes a plurality of pairs of lines of a plurality of fields.

13. The system defined in claim 12 wherein said means for encoding processes a plurality of pairs of lines of each field of said TV program.

14. Apparatus for extracting a complete TV program signal from a TV picture tube comprising a TV set and a picture tube associated therewith, said picture tube having a rear end at the rear of said TV set, a length of wire disposed at to said rear end of said picture tube, and electronic circuitry coupled to said length of wire for processing the TV program signal coupled electrostatically from said picture tube to said wire.

15. The apparatus described in claim 14 wherein said electronic circuitry includes filtering and amplifying means.

16. The apparatus defined in claim 14 and including a piece of insulating board, said length of wire being secured to said board, said electronic circuitry mounted on one surface of said board, and a metal ground plate secured to the surface of said board opposite said electronic circuitry.

17. The apparatus defined in claim 16 and including a shielded cable coupled to said electronic circuitry to couple a tv transmission therefrom.

18. A system for identifying a TV program including a computer containing a series of identifying (ID) digital bits for identifying a TV program, a code generator for generating a series of digital bits known as code bits equal in number to the number of lines in a field of information in a TV program transmission, an antenna receiving a TV program transmission including fields of scan lines containing luminance information and horizontal and vertical sync signals, a first circuit receiving said TV program and including circuit means for extracting the horizontal and vertical sync signals and the lines of luminance information, a multiplexer circuit, a luminance-increasing circuit coupled to said multiplexer circuit and a luminance-decreasing circuit coupled to said multiplexer circuit, a differential encoder receiving an ID bit and a code bit for each line of luminance present at said multiplexer and combining these two bits to provide a control signal to said multiplexer, said control signal determining which of said luminance-increasing or luminance-decreasing circuits operates to increase or decrease the luminance of a line of information, said multiplexer processing the lines of a field in pairs with one line being increased in luminance and the other line being decreased in luminance, said multiplexer having an output at which appears pairs of lines one line of a pair having increased luminance and the other line of a pair having decreased luminance, storage means coupled to the output of said multiplexer for storing each pair of luminance lines output from said multiplexer to form fields of the original TV program but with each pair of lines increased or decreased in luminance, the entire original TV program being reconstituted in said storage means, a decoder circuit for receiving said reconstituted TV program made up of fields of pairs of lines one line having increased luminance and the other line having decreased luminance, said decoder circuit including an integrator circuit receiving each line of a pair of lines of a field of lines and integrating the luminance signal of each line to form an analog signal for each line, a differential amplifier receiving the analog luminance signals of the lines in a pair of lines and providing an output signal which is the difference between the analog values of the two lines of a pair, and means comparing all of the analog values of a field of information with code information in a computer to give each field a digital value of "1" or "0".

19. The system defined in claim 18 wherein the digital values of "1" or "0" for a plurality of fields identify of a TV program.

20. The system defined in claim 18 and a one field delay circuit disposed in the electrical path which transmits luminance lines to said multiplexer.

21. The system defined in claim 18 and including in said decoder a one field delay circuit in series with one imput terminal of said differential amplifier.

22. A television program identifying system comprising a computer containing a plurality of digital identifying (ID)bits coupled to an interface circuit, a composite television program signal including a luminance portion and horizontal (Hsync) and vertical (Vsync) synchronizing signals, a signal separator module receiving said composite television signal, a first output terminal from said signal separator module from which the Hsync signal appears, a second output terminal from which said Vsync signal appears and a third output terminal from which said luminance signal appears, said luminance signal being coupled through a max 454 module to an input of an analog multiplexer, a differential encoder comprising a plurality of gates and a 74HC174 module, a lead from said code generator carrying a digital code bit to one input of said gates and a lead from said computer interface carrying an ID bit to another input of said gates, the output of said gates comprising a D@Chip signal coupled to said analog multiplexer, a code generator for generating 120 digital bits for each field of TV transmission, said code generator including a 74HC374 module coupled to two 74HC157 modules connected in parallel, a connection from said Vsync terminal to said 74 HC374 and said 74HC157 modules to reset said code generator at the beginning of a field of TV transmission and a connection from said two 74HC157 modules to couple a digital code bit to one input of said differential encoder, an encode signal coupled from said differential encoder to an input of said analog multiplexer, and a first amplifier coupled to said analog multiplexer for increasing the luminance of a line of luminance coupled thereto and a second amplifier coupled to said analog multiplexer for reducing the luminance of a line of luminance coupled increase of thereto, the and decrease luminance being controlled by said D@Chip signal coupled to said analog multiplexer.

23. A television program identification system including a tv transmission made up of fields of scan lines of composite television signals including a luminance signal and horizontal sync signals and vertical sync signals, the lines of each field having their luminance coded in pairs with one line of a pair having its luminance increased and the other line of the pair having its luminance decreased, a tv set receiving said tv transmission and having a picture tube having a rear end at the rear of the tv set, an electrostatic pickup wire at the rear of said picture tube where it can extract the entire tv transmission signal as it is being watched on said tv set, means coupling the scan lines of the fields of said tv transmission to a first circuit module, said first circuit module separating the lines of the fields of said tv transmission into luminance signal, the Hsync signal and the Vsync signal, second means coupling the luminance signal of each line of a pair of lines to an integrating capacitor across which the luminance is integrated and then fed to a sample and hold amplifier, one luminance signal of a pair, called an A signal, being held in one of said sample and hold amplifiers and the other luminance signal of a pair, called a B signal, being held in the other sample and hold amplifier, a differential amplifier having a first input which receives said A signal and a second input which receives said B signal and an output, an offset and comparison threshold circuit made up of a plurality of amplifiers the output of which is a digital "1" or "0" signal depending on the sign of the difference between signal A and signal B, a multiplexer module operable as a channel selector, the digital output of said offset and threshold comparison circuit being coupled to one input of said multiplexer module, a channel separator module comprising a counter and coupling outputs of channel A and channel B to inputs of said multiplexer, a module having one input which receives the output of said multiplexer module a plurality of other inputs which receive the output of a code generator which generates a series of 120 digital codes, a digital to analog converter coupled to the outputs of said digital correlator, a parallel amplifier arrangement receiving the ouput of said digital to analog converter and providing either a digital "1" or a digital "0" as test points, the D6 output of the digital correlator U74 is also coupled to circuit means for generating data bits including a pair of multivibrators and a series of gates the output of which is a digital "1" or a digital "0", and means comparing a 120 bits with ID bits in a computer to identify a tv program.

24. A system for identifying a TV program transmission comprising a computer including a database made up of groups of digital identifying CID) bits, each group of digital ID bits identifying a specific TV program, an encoder system including means for encoding the luminance of pairs of lines of a plurality of fields of a TV program transmission the encoding comprising modying the luminanceof a line, in each pair the luminance of one line being increased and the luminance of the other line being decreased, the luminance change for each line being controlled and determined by one of said digital ID bits and a code bit, a code generator generating said code bit, said code generator being programmed to generate a series of random digital code bits, with one code bit being provided for each line of a tv field, and circuit means combining each code bit with the same ID bit for all of the lines in one tv field, the signal produced by the combination of an ID bit and a code bit determining whether the luminance of the first line of a pair of lines is increased and the luminance of the second line is reduced or whether the luminance of the first line of a pair is reduced and the luminance of the second line of a pair is increased.

25. The system defined in claim 24 wherein each ID bit and its code bit are exclusive ORed in said circuit means to thereby produce a control signal therefrom.

26. The system defined in claim 24 wherein said circuit means is a differential encoder which receives an ID bit and a code bit and generates therefrom a control signal, and a multiplexer circuit which receives (1) the luminance portion of each line of a field, (2) means for increasing the brightness of the luminance of a line, (3) means for decreasing the luminance of a line and (4) a control signal formed from an ID bit and a code bit, the control signal operating in said multiplexer to control whether a particular line has its luminance increased or decreased.

27. The system defined in claim 26 wherein there are 120 pairs of lines in a field of a tv transmission.

28. The system defined in claim 27 wherein said code generator generates 120 digital code bits.

* * * * *